(12) United States Patent
Paulsen et al.

(10) Patent No.: US 8,099,329 B2
(45) Date of Patent: Jan. 17, 2012

(54) SYSTEMS AND METHODS FOR DETERMINING TAXES OWED FOR FINANCIAL TRANSACTIONS CONDUCTED OVER A NETWORK

(75) Inventors: Kobus Paulsen, Bromley (GB); Ian Hughes, Gwynedd (GB); Mark Holland, Storrington (GB)

(73) Assignee: UC Group Limited (GB)

( * ) Notice: Subject to any disclaimer, the term of this patent is extended or adjusted under 35 U.S.C. 154(b) by 996 days.

(21) Appl. No.: 11/609,775

(22) Filed: Dec. 12, 2006

(65) Prior Publication Data

US 2007/0250392 A1    Oct. 25, 2007

Related U.S. Application Data

(60) Provisional application No. 60/745,561, filed on Apr. 25, 2006.

(51) Int. Cl.
*G06Q 20/00* (2006.01)
(52) U.S. Cl. ............. 705/19; 705/16; 705/17; 705/26; 705/30; 705/31; 705/39; 705/40; 705/74; 705/75; 705/78; 705/80; 235/375; 235/379; 235/380
(58) Field of Classification Search .............. 705/19
See application file for complete search history.

(56) References Cited

U.S. PATENT DOCUMENTS

| | | | |
|---|---|---|---|
| 5,530,438 A | 6/1996 | Bickham et al. | |
| 5,777,305 A | 7/1998 | Smith et al. | |
| 5,799,283 A | 8/1998 | Francisco et al. | |
| 5,825,881 A | 10/1998 | Colvin | |
| 5,903,878 A | 5/1999 | Talati et al. | |
| 5,949,876 A | 9/1999 | Ginter et al. | |
| 6,029,150 A | 2/2000 | Kravitz | |
| 6,029,154 A | 2/2000 | Pettitt | |
| 6,157,871 A | 12/2000 | Terranova | |
| 6,389,402 B1 | 5/2002 | Ginter et al. | |
| 6,468,155 B1 | 10/2002 | Zucker et al. | |
| 6,629,890 B2 | 10/2003 | Johnson | |
| 6,904,408 B1 | 6/2005 | McCarthy et al. | |
| 6,993,502 B1 * | 1/2006 | Gryglewicz et al. ............ | 705/31 |
| 7,124,101 B1 | 10/2006 | Mikurak | |

(Continued)

FOREIGN PATENT DOCUMENTS

GB    2 362 242 A    11/2001

(Continued)

OTHER PUBLICATIONS

Baker, Michael B. Selecting a corporate payment system. Business Travel News , vol. 23 , No. 7 , p. 89(7) , Apr. 24, 2006.*

(Continued)

*Primary Examiner* — F. Zeender
*Assistant Examiner* — Fawaad Haider
(74) *Attorney, Agent, or Firm* — Alston & Bird LLP

(57) ABSTRACT

Various embodiments of the invention provide a more secure financial transaction system for e-commerce sectors that (1) more securely processes payment transactions, (2) helps to protect merchants and banks against fraudulent transactions, money laundering, and underage gambling, and (3) helps to limit other abuses in areas of e-commerce that are perceived to pose special risks, such as Internet gaming, travel, and consumer purchasing of electronic goods. To accomplish the above goals, various embodiments of the financial transaction system (1) establish operating and transaction processing protocols for merchants, Internet payment service providers, acquiring banks, and card schemes and (2) provide automated systems for monitoring and securely processing payment and financial transactions.

11 Claims, 22 Drawing Sheets

U.S. PATENT DOCUMENTS

| | | |
|---|---|---|
| 7,263,506 B2 | 8/2007 | Lee et al. |
| 7,275,685 B2 | 10/2007 | Gray et al. |
| 7,296,003 B2 | 11/2007 | Mersky et al. |
| 7,305,350 B1 | 12/2007 | Bruecken |
| 7,403,922 B1 | 7/2008 | Lewis et al. |
| 7,548,886 B2 | 6/2009 | Kirkland et al. |
| 7,575,157 B2 | 8/2009 | Barnhardt et al. |
| 7,591,413 B1 | 9/2009 | Block et al. |
| 7,680,736 B2 | 3/2010 | Jarman et al. |
| 7,865,414 B2 | 1/2011 | Fung et al. |
| 7,941,370 B2 | 5/2011 | Paulsen et al. |
| 2001/0001321 A1 | 5/2001 | Resnick et al. |
| 2001/0032878 A1 | 10/2001 | Tsiounis et al. |
| 2001/0037290 A1 | 11/2001 | Lai |
| 2001/0039535 A1 | 11/2001 | Tsiounis et al. |
| 2001/0044787 A1 | 11/2001 | Shwartz et al. |
| 2002/0002075 A1 | 1/2002 | Rowe |
| 2002/0029194 A1 | 3/2002 | Lewis et al. |
| 2002/0052754 A1 | 5/2002 | Joyce et al. |
| 2002/0077837 A1 | 6/2002 | Krueger et al. |
| 2002/0099649 A1 | 7/2002 | Lee et al. |
| 2002/0116302 A1 | 8/2002 | Wilmes et al. |
| 2002/0133466 A1 | 9/2002 | Pugh |
| 2002/0139837 A1 | 10/2002 | Spitz et al. |
| 2002/0143566 A1 | 10/2002 | Diveley |
| 2002/0161707 A1 | 10/2002 | Cole et al. |
| 2003/0045358 A1 | 3/2003 | Leen et al. |
| 2003/0065571 A1 | 4/2003 | Dutta |
| 2003/0097303 A1* | 5/2003 | Agee et al. ............ 705/19 |
| 2003/0125973 A1 | 7/2003 | Mathews et al. |
| 2003/0191709 A1 | 10/2003 | Elston et al. |
| 2004/0019543 A1 | 1/2004 | Blagg et al. |
| 2004/0044739 A1 | 3/2004 | Ziegler |
| 2004/0082384 A1 | 4/2004 | Walker et al. |
| 2004/0098337 A1 | 5/2004 | Gudgeon et al. |
| 2004/0147320 A1 | 7/2004 | Schmidt et al. |
| 2004/0153444 A1 | 8/2004 | Senders et al. |
| 2004/0215560 A1 | 10/2004 | Amalraj et al. |
| 2004/0230490 A1 | 11/2004 | Barsade et al. |
| 2004/0243832 A1 | 12/2004 | Wilf et al. |
| 2005/0021853 A1 | 1/2005 | Parekh et al. |
| 2005/0033653 A1 | 2/2005 | Eisenberg et al. |
| 2005/0097046 A1 | 5/2005 | Singfield |
| 2005/0137987 A1 | 6/2005 | May et al. |
| 2006/0010252 A1 | 1/2006 | Miltonberger et al. |
| 2006/0085275 A1 | 4/2006 | Stokes et al. |
| 2006/0095350 A1 | 5/2006 | Hall et al. |
| 2006/0143119 A1 | 6/2006 | Krueger et al. |
| 2006/0151598 A1 | 7/2006 | Chen et al. |
| 2006/0268319 A1 | 11/2006 | Winkel et al. |
| 2006/0282365 A1 | 12/2006 | Lutnick et al. |
| 2007/0106603 A1 | 5/2007 | Whyte et al. |
| 2007/0136189 A1 | 6/2007 | German et al. |
| 2007/0250392 A1 | 10/2007 | Paulsen et al. |
| 2007/0250440 A1 | 10/2007 | Paulsen et al. |
| 2007/0250441 A1 | 10/2007 | Paulsen et al. |
| 2008/0040275 A1 | 2/2008 | Paulsen et al. |
| 2008/0072305 A1 | 3/2008 | Casado et al. |
| 2008/0215472 A1 | 9/2008 | Brown et al. |
| 2008/0265020 A1 | 10/2008 | Copeland et al. |
| 2008/0290154 A1 | 11/2008 | Barnhardt et al. |
| 2009/0125430 A1 | 5/2009 | Krueger et al. |
| 2009/0132405 A1 | 5/2009 | Scipioni et al. |
| 2009/0138398 A1 | 5/2009 | Cole et al. |
| 2009/0150262 A1 | 6/2009 | Mizhen |
| 2009/0176558 A1 | 7/2009 | Englman et al. |
| 2009/0327010 A1 | 12/2009 | Vadhri et al. |
| 2010/0057598 A1 | 3/2010 | Bercy et al. |

FOREIGN PATENT DOCUMENTS

| | | |
|---|---|---|
| GB | 2 366 007 A | 2/2002 |
| JP | 2002/000889 A | 8/2002 |
| SG | 104342 | 6/2004 |
| WO | WO 00/49554 | 8/2000 |
| WO | WO 01/18712 | 3/2001 |
| WO | WO 01/33522 A1 | 5/2001 |
| WO | WO 01/77959 A1 | 10/2001 |
| WO | WO 02/097563 A2 | 12/2002 |
| WO | WO 2004/084113 A1 | 9/2004 |
| WO | WO 2005/022453 A1 | 3/2005 |
| WO | WO 2005/065038 | 7/2005 |
| WO | WO 2006/034205 A2 | 3/2006 |
| WO | WO 2007/091844 | 8/2007 |
| WO | WO 2007/125316 | 11/2007 |

OTHER PUBLICATIONS

International Search Report for PCT/GB2007/001513, mailing date Feb. 20, 2008.
Office Action dated Nov. 14, 2008, U.S. Appl. No. 11/609,779, filed Dec. 12, 2006.
Office Action from corresponding U.S. Appl. No. 11/609,792 dated May 15, 2009.
"Teilnehmeridentifizierung im Internet unter Verwendung von Geolocation Services", Siemens AG, Nov. 10, 2006, pp. 1-3.
Herrera, Sebastian, "Method for Geolocation Based on the Unique Identifier Information of an Electronic Device Detected by the First Router in a Network Connection"; May 24, 2007, 22 pages.
Communication Relating to the Results of the Partial International Search Report from International Application No. PCT/GB2009/002532 mailed Feb. 16, 2010.
Office Action from corresponding U.S. Appl. No. 11/609,792 dated Oct. 14, 2009.
Office Action dated Apr. 22, 2009, for U.S. Appl. No. 11/609,779, filed Dec. 12, 2006.
Office Action dated Oct. 8, 2008, U.S. Appl. No. 11/609,792, filed Dec. 12, 2006.
"Do you want to know where your Internet visitors are coming from? Which country? Which state? Which city? Which ISP?" http://web.archive.org/web/20050424080032/http://www.ip2location.com, Apr. 24, 2005, pp. 1-7, retrieved Jan. 8, 2008.
"Do you want to know where your Internet visitors are coming from? Which country? Which state? Which city? Which ISP?" http://web.archive.org/web/20060424142741/http://www.ip2location.com, Apr. 24, 2006, pp. 1-9, retrieved Jan. 8, 2008.
"Credit Card Fraud Prevention Using ASP and COM Technology," published by Hexa Software Development Center, 2002-2003, pp. 1-4.
IP2Location, "Introduction," http://www.ip2location.com, Apr. 24, 2006, pp. 1-4.
Office Communication from corresponding U.S. Appl. No. 11/609,779 dated May 29, 2008.
Office Action from corresponding U.S. Appl. No. 11/609,785 mailed Mar. 16, 2010.
Office Action from corresponding U.S. Appl. No. 11/609,785 mailed Sep. 14, 2009.
Office Action from corresponding U.S. Appl. No. 11/609,792 mailed Mar. 17, 2010.
International Search Report and Written Opinion from corresponding International Application No. PCT/GB2009/002532 mailed Apr. 15, 2010.
Banasiak, Michael, Behavior Scoring (credit management), Business Credit, Mar. 1, 2001.
Final Office Action U.S. Appl. No. 11/609,779, dated Jun. 22, 2010.
Final Office Action U.S. Appl. No. 11/609,792, dated Sep. 20, 2010.
Merriam-Webster Dictionary, $9^{th}$ Ed., 1991, Def. "associate".
Cole, "Merchant Account Reserve," Ezine Articles, Internet-and-Businesses-Online/Ecommerce, http://ezinearticles.com/?Merchant-Account-Reserve&id=1249597, 4 pages, printed Feb. 11, 2009.
Reference A: Daniel Wolfe, IP Address Analysis Becoming a Bigger Fraud-Detection Tool, American Bankr, Section: vol. 170. p. 17, May 19, 2005.
Notice of Allowance U.S. Appl. No. 11/609,779, dated Jan. 6, 2011.
Authorize.Net—"How It Works" Diagram; available at http://www.authorize.net/resources/howitworksdiagram; retrieved Oct. 10, 2006.
RGT Online, *U.S. online gambling prohibition likely not enforceable*, dated Thursday, Oct. 5, 2006, available at http://www.rgtonline.com/Article.cfm?ArticleId=67957&CategoryName=Article%20Search=%20...; retreived Oct. 5, 2006.
Security Best Practices, *Protecting Your Business*, (pp. 1-5) and Fraud Detection Suite, *Protecting Your Business From Fraud*, (pp. 1-3).

Final Office Action U.S. Appl. No. 11/609,792, dated Feb. 24, 2011.
International Preliminary Search Report for PCT/GB2007/001513 mailed Dec. 17, 2008.
EP Official Letter for EP 07 732 550.4 mailed May 29, 2009.
PRC Office Action for Application No. 200780023244.X, mailed Dec. 27, 2010.
International Preliminary Search Report for PCT/GB2009/002532 mailed Feb. 9, 2011.
Office Action for U.S. Appl. No. 11/609,792 mailed Jul. 7, 2011.
Office Action for U.S. Appl. No. 12/257,883 mailed Mar. 22, 2011.
Office Action for U.S. Appl. No. 11/609,779 mailed Jan. 6, 2010.
Office Action for U.S. Appl. No. 11/609,779 mailed Sep. 2, 2009.
Office Action for U.S. Appl. No. 12/257,883 mailed Sep. 8, 2011.
JP Office Action for Application No. 2009-507154 mailed Sep. 2, 2011.

\* cited by examiner

SYSTEMS AND METHODS FOR DETERMINING TAXES OWED FOR FINANCIAL TRANSACTIONS CONDUCTED OVER A NETWORK

CROSS REFERENCE TO RELATED APPLICATIONS

This application claims priority from U.S. Provisional Patent Application Ser. No. 60/745,561, entitled "Systems and Methods for Providing Financial Transactions over a Network", filed on Apr. 25, 2006, the contents of which are herein incorporated by reference in their entirety. In addition, this application herein incorporates by reference co-pending U.S. patent application Ser. No. 11/609,785, entitled "Systems and Methods for Identifying Potentially Fraudulent Financial Transactions and Compulsive Spending Behavior", filed on Dec. 12, 2006, co-pending U.S. patent application Ser. No. 11/609,779, entitled "Systems and Methods for Funding Payback Requests for Financial Transactions", filed on Dec. 12, 2006, and co-pending U.S. patent application Ser. No. 11/609,792, entitled "Systems and Methods for Determining Regulations Governing Financial Transactions Conducted over a Network", filed on Dec. 12, 2006.

BACKGROUND OF THE INVENTION

In general, when a customer wishes to use a payment card (e.g., credit card or debit card) with a merchant (on the Internet or otherwise), the merchant sends an electronic authorization request to an acquiring bank. The acquiring bank passes the electronic authorization request to the issuing bank (i.e., the bank or financial institution that issued the payment card to the customer) via the card issuer network (e.g., Visa, MasterCard, American Express, or private card issuer network). The issuing bank verifies that the customer has sufficient credit available, is not delinquent with payments, and that all information (e.g., card number, card verification value number, and card holder details) that has been supplied is correct. The issuing bank then sends an electronic message authorizing the payment, via the card issuer network, to the acquiring bank, and the acquiring bank sends the electronic message to the merchant. The merchant accepts this authorization message as proof of future payment by the issuing bank. The actual transfer of the funds takes place at a later stage, referred to as the settlement process.

Payment card transactions that occur over the Internet or other networks involve risks not necessarily present in face-to-face payment transactions because the card holder and the merchant are not normally together when the transaction occurs. In addition, some e-commerce sectors, such as gambling and adult entertainment, raise additional public interest concerns that further highlight a need for a system for making payment card transactions secure and preventing fraud and other abuses.

BRIEF SUMMARY OF VARIOUS EMBODIMENTS OF THE INVENTION

Various embodiments of the invention provide a more secure financial transaction system for e-commerce sectors that (1) more securely processes payment transactions, (2) helps to protect merchants and banks against fraudulent transactions, money laundering, and underage gambling, and (3) helps to limit other abuses in areas of e-commerce that are perceived to pose special risks, such as Internet gaming, travel, and consumer purchasing of electronic goods. To accomplish the above goals, various embodiments of the financial transaction system (1) establish operating and transaction processing protocols for merchants, Internet payment service providers, acquiring banks, and card schemes and (2) provide automated systems for monitoring and securely processing payment and financial transactions. Two or more of the various embodiments described herein may be combined to provide a system or method that meets one or more of these goals.

According to various embodiments of the invention, a system for processing a financial transaction with an online merchant is provided. The system includes a payment service provider module that is configured for: (1) receiving a request to transfer funds from a customer account to an online merchant; (2) in response to receiving the request to transfer funds, allocating at least a portion of the funds to be paid to the online merchant to an escrow account; and (3) in response to allocating a portion of the funds to be paid to the online merchant to an escrow account, storing the allocated portion of funds in the escrow account for the lesser of a predetermined period of time or until a request for a chargeback or refund request is received by the system. In addition, in one embodiment, the request may be received from a merchant computing device in communication with the payment services provider module over a network.

In one embodiment, the payment service provider module is further configured for periodically generating a reconciliation report for each online merchant that lists transfer requests that have been received and portions of funds that have been allocated to the escrow account. In other various embodiments, the payment service provider module is further configured for receiving a chargeback request or a refund request for funds previously transferred to the merchant from the customer account; and in response to receiving the chargeback request or the refund request, funding the chargeback request or the refund request from the funds stored in the escrow account.

In a further embodiment, the system also includes a fraud prevention module that is configured for applying one or more fraud filters to the request. The fraud filters may include: (1) comparing a first location associated with the customer account with a second location associated with a customer computing device used to transmit the request to the online merchant, and in response to the first location being outside of a first predetermined acceptable distance of the second location, marking the request as potentially fraudulent; (2) comparing a third location associated with a customer email address with the second location, and in response to the third location being outside of a second predetermined acceptable distance of the second location, marking the request as potentially fraudulent; (3) comparing a fourth location associated with a customer billing address for the customer account with the second location, and in response to the fourth location being outside of a third predetermined acceptable distance of the second location, marking the request as potentially fraudulent; (4) comparing a customer identification with a list of individuals prohibited from conducting financial transactions, and in response to the customer identification matching one of the individuals on the list, marking the request as potentially fraudulent; and/or (5) comparing an identification of a customer account with a list of accounts prohibited from conducting financial transactions, and in response to the identification of the customer account matching one of the accounts on the list, marking the request as potentially fraudulent.

According to various embodiments of the invention, a method of funding a payback request received from a customer is provided. The method includes the steps of: (1) establishing an escrow account for a merchant (e.g., an online merchant) that is funded by a percentage of funds to be paid to the merchant from one or more accounts associated with one or more customers; (2) receiving a payback request for a payment previously made to the merchant from an account associated with a particular customer; and (3) funding the payback request with funds stored in the escrow account. In one embodiment, the step of funding the payback request occurs without dispute. In addition, according to various embodiments, the payback request is a chargeback request or a refund request.

In addition, in a further embodiment, the method also includes the step of transferring a portion of the funds in the escrow account to the merchant in response to the portion of funds being stored in the escrow account for a particular time period (e.g., at least six months). In another embodiment, the method further includes the steps of: (1)

reducing the percentage of funds to be paid by the merchant into the escrow account in response to the merchant receiving a reduced number of payback requests over a particular time period; and (2) increasing the percentage of funds to be paid by the merchant into the escrow account in response to the merchant receiving an increased number of payback request over said particular time period. In yet another embodiment, the method includes the step of applying one or more fraud filters that are configured for identifying potentially fraudulent payback requests to the payback request. The fraud filters are executed by a fraud prevention module implemented on a computer readable medium according to one embodiment of the invention.

Various embodiments of the invention provide a method of funding a payback request to a customer that the steps of: (1) receiving a payback request for a payment previously made to the merchant with an account associated with a customer; and (2)

funding the payback request to the customer with funds stored in an account associated with the merchant without dispute. The payback request may be a chargeback request or a refund request, according to various embodiments. In addition, the payback request may be received from a financial institution holding the account associated with the customer according to one embodiment, and the funds for the payback request may be paid to a financial institution holding the account associated with the customer.

According to various other embodiments of the invention, a fraud prevention system for identifying potentially fraudulent online financial transactions received from a customer for an online merchant is provided. The fraud prevention system includes a fraud prevention module that is configured for applying one or more of the fraud filters described above to each of one or more financial transactions received from one or more customers. In addition, in various embodiments, the fraud filters may also include: (1) comparing information associated with one or more subsequent financial transactions to the financial transactions stored in the fraud database, and in response to the customer account, customer identification, or customer billing address of each of the one or more subsequent financial transactions matching any of the financial transactions stored in the fraud database, marking the one or more subsequent financial transactions as potentially fraudulent; and (2) comparing the first location with the third location, and in response to the first location being outside of a first predetermined acceptable distance of the third location, marking the financial transaction as potentially fraudulent. In addition, in an embodiment in which the second location comprises a country, the fraud filters further include comparing the second location with a list of countries that are prohibited from conducting financial transactions with the merchant, and in response to the second location being on the list of countries, preventing the financial transaction from being conducted.

In another embodiment, the list of accounts prohibited from conducting financial transactions is a list of stolen accounts. In yet another embodiment, the first location is a location associated with a financial institution that manages the customer account. And, in another embodiment, the first location is a billing address associated with the customer account. According to various other embodiments, the first location, the second location, the third location, and the fourth location may be a country, a region, a state, a locality, a county, a city, or a postal district defined by one or more postal codes. Furthermore, in one embodiment, the list of individuals and/or the list of accounts may be published by a government authority.

In addition, in one embodiment of the invention, the fraud filters are selected based on the location of the merchant. In another embodiment of the invention, the fraud filters are selected based on the second location. And, in yet another embodiment of the invention, the fraud filters are selected based on the first location.

In another embodiment, the system further includes a payment service provider module that is configured for receiving a payback request for the customer, and the fraud prevention module is further configured for comparing an identity of the customer requesting the payback to a list of officers, directors, or owners associated with the online merchant. In response to the customer being on the list of directors, officers, or owners, the fraud prevention module marks the payback request as potentially fraudulent.

According to yet another embodiment of the invention, the financial transaction is a gambling payout request and the fraud prevention module is further configured for comparing an identification of an account named by the customer for receiving a payout from the merchant with an identification of an account used by the customer to place bets with the merchant. In response to the identification of the account named for receiving the payout not matching the identification of the account used to place bets with the merchant, the fraud prevention module marks the payout request as potentially fraudulent. In a further embodiment, the fraud prevention module is further configured for preventing a payout amount provided in the payout request from being transferred to the account named for receiving the payout. In another embodiment, the account named for receiving the payout request is associated with a first payment card and the account used to place bets with the merchant is associated with a second payment card, and the fraud prevention module is further configured for comparing the first payment card to the second payment card. In response to the first payment card not matching the second payment card, the fraud prevention module marks the payout request as potentially fraudulent.

According to various embodiments of the invention, a system for monitoring a compulsive spending behavior of a customer is provided. The system includes a processor and a memory, and the processor is configured for: (1) storing, in the memory, information associated with each of one or more requests from the customer to conduct financial transactions with a merchant, the information comprising an amount of funds; (2) receiving a new request comprising a new amount of funds to conduct a financial transaction with the merchant; (3) in response to receiving the new request, retrieving a total amount of funds stored in the memory; (4) comparing a sum of the total amount of funds and the amount of funds in the new request with a pre-determined acceptable limit; and (5) in response to the sum exceeding the pre-determined acceptable limit, notifying one or more of the customer, a payment source associated with the customer, or the merchant that the pre-determined acceptable limit has been exceeded. In a particular embodiment, the information stored in the memory further comprises a date on which each request was received by the merchant; and the processor is further configured for comparing the sum of the total amount of funds stored in the memory within a particular time period and the amount of funds in the new request with the pre-determined acceptable limit.

According to various other embodiments of the invention, another system for monitoring a compulsive gambling behavior of a customer is provided. The system is similar to the system described above, but the processor is further configured for retrieving the total amount of funds stored in the memory for the type of financial transaction in the new request and comparing a sum of the total amount of funds and the amount of funds in the new request with a pre-determined acceptable limit associated with the type of financial transaction in the new request. In various embodiments of the invention, the type of transaction may be a request to transfer funds to the merchant from an account associated with the customer or a request to place a bet using funds previously transferred to the merchant. In addition, in one embodiment, the requests and the new request are received by a computing device associated with the merchant from one or more computing devices associated with the customer over a network. In a particular embodiment in which the information stored in the memory includes a date on which the request was received by the merchant, the processor is further configured for comparing the sum of the total amount of funds requested by the customer within a particular time period and the amount of funds in the new request with the pre-determined acceptable limit. In another embodiment, the processor is further configured for preventing the new request from being processed in response to the sum exceeding the pre-determined acceptable limit.

According to various embodiments of the invention, a third system for monitoring a compulsive spending behavior of a customer is provided that is similar to the first system described above, but the information associated with the requests includes a date on which the request was received by the merchant. The process of the third system is further configured for retrieving a total number of transactions stored in the memory within a particular time period, comparing the total number of transactions with a pre-determined acceptable limit, and in response to the total number of transactions exceeding the pre-determined acceptable limit, notifying one or more of the customer, a payment source associated with the customer, or the merchant that the limit has been exceeded.

Various embodiments of the invention provide a tax accounting system for financial transactions conducted with online merchants. The tax accounting system includes a memory and a processor, and the memory is configured for storing one or more types of tax and corresponding taxation rates for each of one or more tax jurisdictions. The processor is configured for: (1) receiving information associated with a financial transaction conducted with an online merchant from a customer; (2) in response to receiving the information associated with the financial transaction, identifying one or more tax jurisdictions associated with the financial transaction; (3) in response to identifying the one or more tax jurisdictions associated with the financial transaction, querying the memory to determine whether one or more types of tax are associated with the one or more tax jurisdictions; (4) in response to determining that one or more types of tax are associated with the one or more tax jurisdictions, applying the corresponding taxation rates for each of the one or more types of tax to the information associated with the financial transaction to determine an amount of tax owed; and (5) in response to determining the amount of tax owed, transferring the amount of tax owed to one or more relevant tax authorities. In various embodiments, the tax jurisdictions are associated with a location of the online merchant, a location of the customer, and/or a location of a computing device used by the customer to conduct the financial transaction.

In a further embodiment, the processor is further configured for transferring the amount to the one or more relevant tax authorities via electronic funds transfer. In another embodiment, the processor is further configured for storing the amount of tax owed and the amount transferred to the one or more relevant tax authorities in the memory with the financial transaction information for a particular period of time. In yet another embodiment, the processor is further configured for generating an accounting report for each of the one or more relevant tax authorities, the accounting report comprising the amount of taxes owed to the relevant tax authority, the amount of tax transferred to the relevant tax authority, and at least a portion of the information associated with the financial transaction for which taxes were paid to the relevant tax authority.

According to various other embodiments of the invention, a system for processing a financial transaction conducted with an online merchant is provided. The system includes a payment service provider module that is configured for: (1) receiving a request to transfer funds from a customer account to an online merchant, the request including a first location associated with the customer's address and a second location of a computing device that generated the request; (2) in response to receiving the request, comparing the first location, the second location, and a location of the online merchant with a list of locations that regulate the transfer of funds to the online merchant; (3) in response to the first location, the second location, or the location of the online merchant matching a location on the list of locations, determining whether one or more regulatory authorities regulate the transfer of funds from the customer account to the online merchant in the first location, the second location, or the location of the online merchant; and (4) in response to determining that the one or more regulatory authorities regulate the transfer of funds to the online merchant in the first location, the second location, or the location of the online merchant, notifying one or more of the customer, the merchant, or a bank associated with an account of the customer associated with the financial transaction of one or more types of regulations to which the transfer of funds is subject. The types of regulations include one or more of a prohibition of the transfer, a limitation on the transfer, or a tax on the transfer. In one embodiment, the second location is associated with an Internet protocol address issued to the computing device that generated the request.

According to various embodiments of the invention, a second system for processing a financial transaction conducted with an online merchant is provided. The system includes a payment service provider module that is configured for: (1) receiving a request to conduct a financial transaction (e.g., a request to place a gambling bet with the online merchant, a request to transfer funds to the online merchant, or a request for a payout resulting from one or more gambling bets placed with the online merchant) between a customer account and an online merchant, the request comprising a first location associated with the customer's address and a second location of a computing device that generated the request; (2) in response to receiving the request, comparing the first location, the second location, and the location of the merchant with a list of locations that regulate financial transactions conducted with the online merchant; (3) in response to the first location, the second location, or the location of the merchant matching a location on the list of locations, determining whether one or more regulatory authorities regulate financial transactions conducted with the online merchant in the first location, the second location, or the location of the online merchant; and (4) in response to determining that the one or more regulatory authorities regulate financial transactions in the first location, the second location, or the location of the merchant, notifying one or more of the customer, the merchant, or a bank associated with an account of the customer associated with the financial transaction of a type of regulation to which the financial transaction is subject.

In one embodiment, the payment services provider module is further configured for preventing the financial transaction from being conducted with the merchant in response to determining that the one or more regulatory authorities regulate financial transactions conducted with the online merchant in the first location, the second location, or the location of the online merchant. In addition, in a further embodiment, the payment services provider module is further configured for notifying one or more of the online merchant or the bank associated with the customer's account in response to determining that the one or more regulatory authorities regulate financial transactions conducted with the online merchant in the first location, the second location, or the location of the online merchant.

BRIEF DESCRIPTION OF THE DRAWINGS

Figure 1:
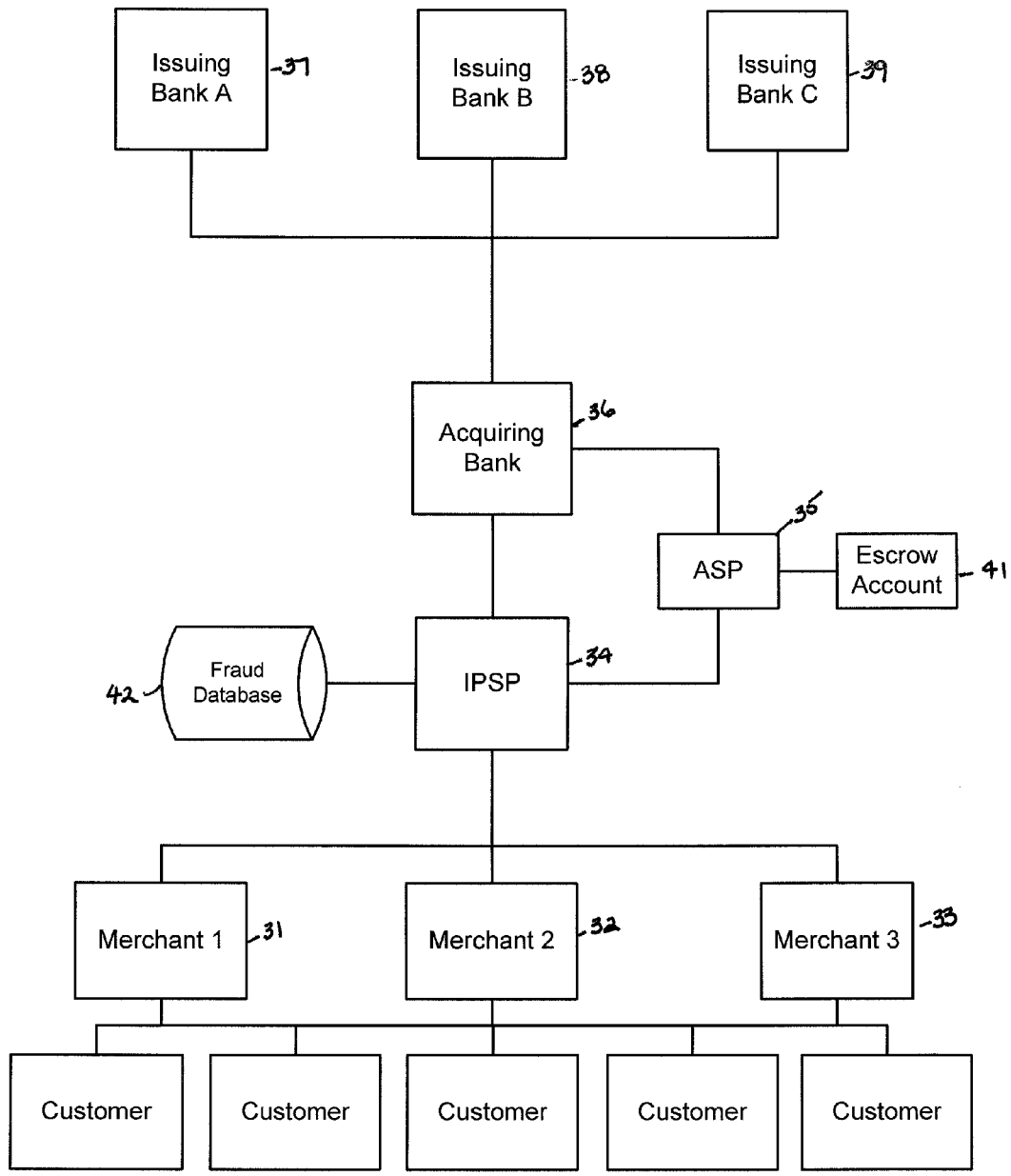
Figure 2:
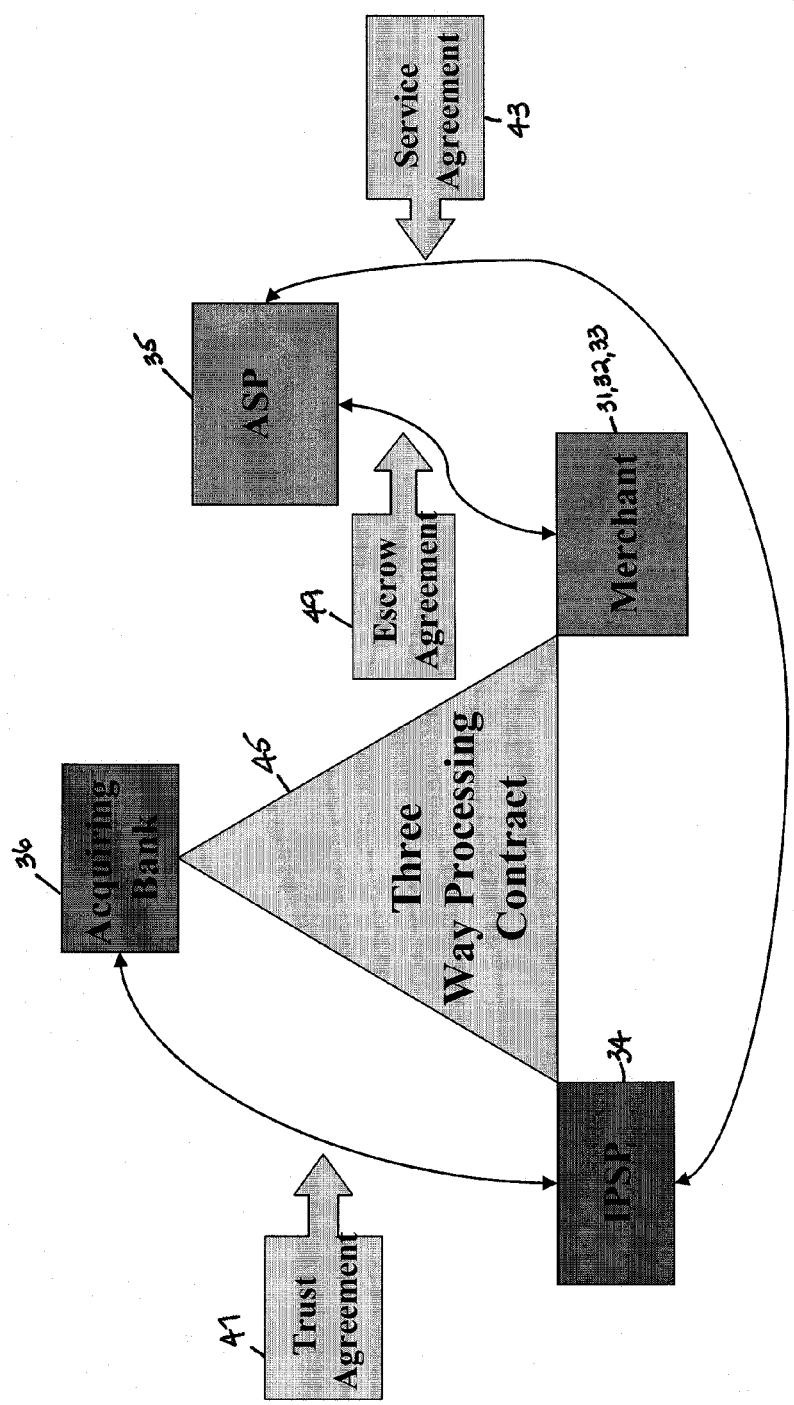
Figure 3A:
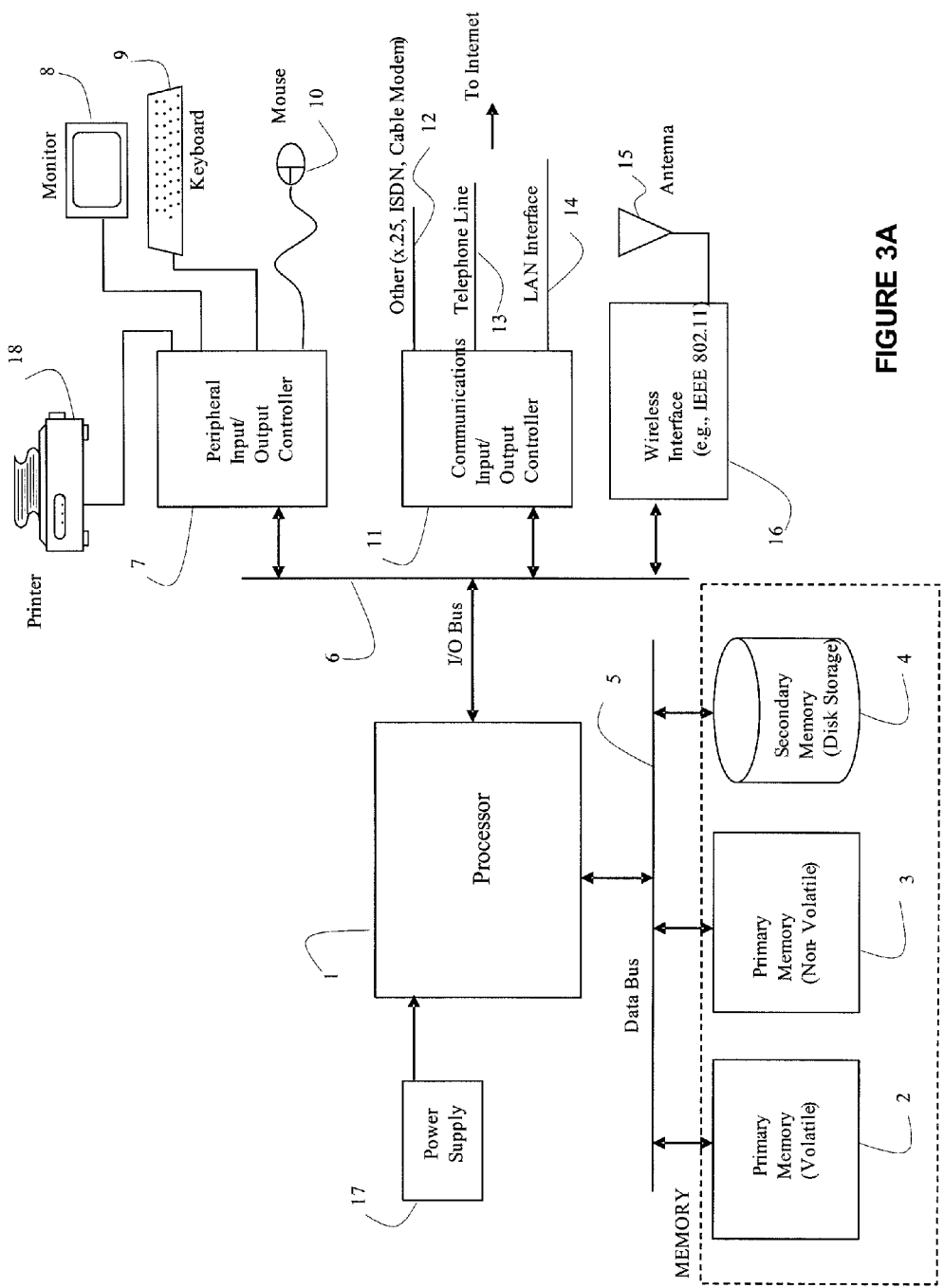
Figure 3B:
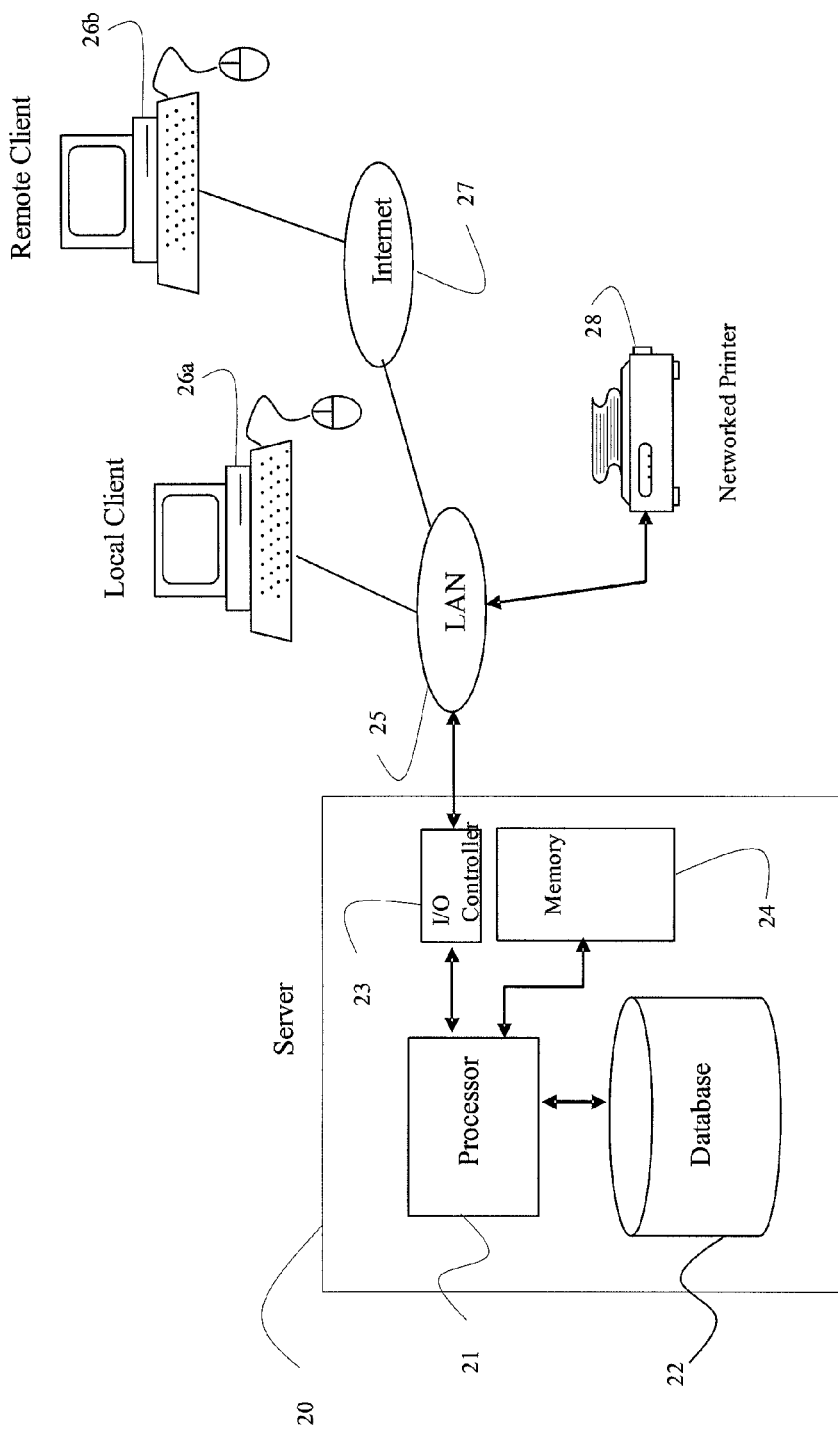
Figure 4:
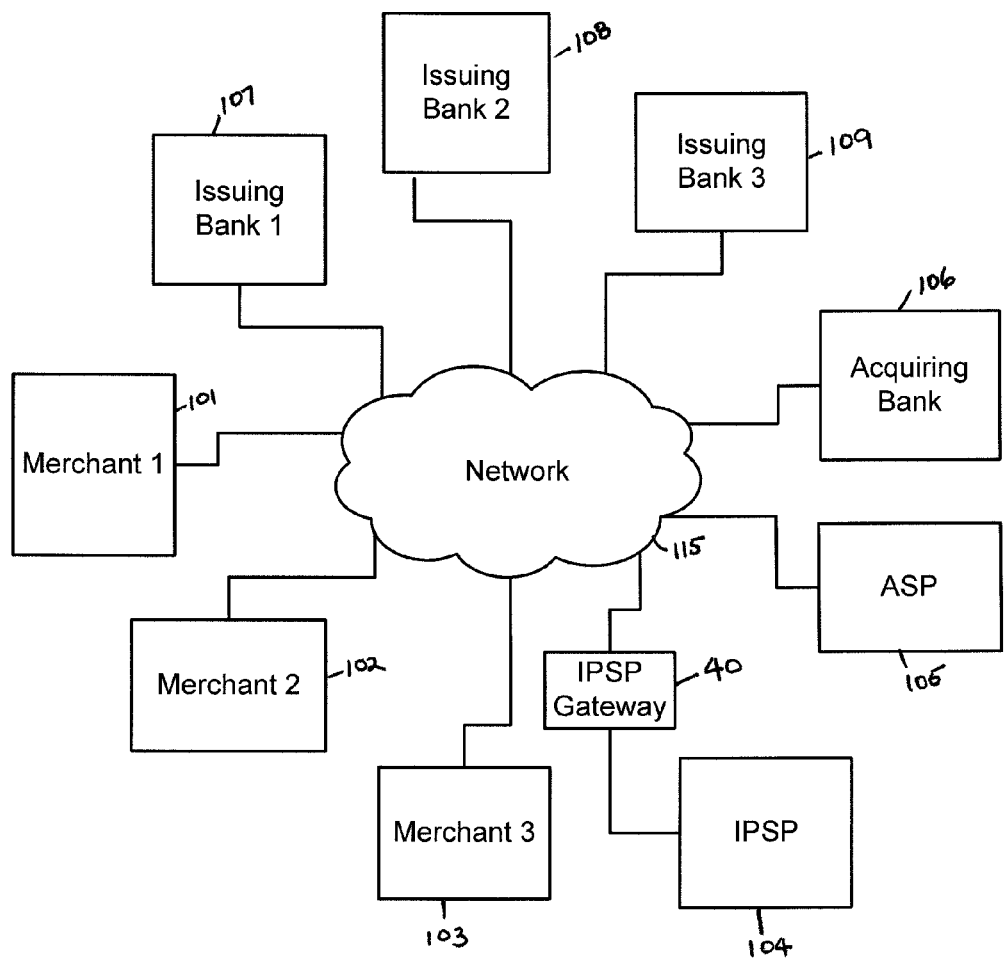
Figure 5:
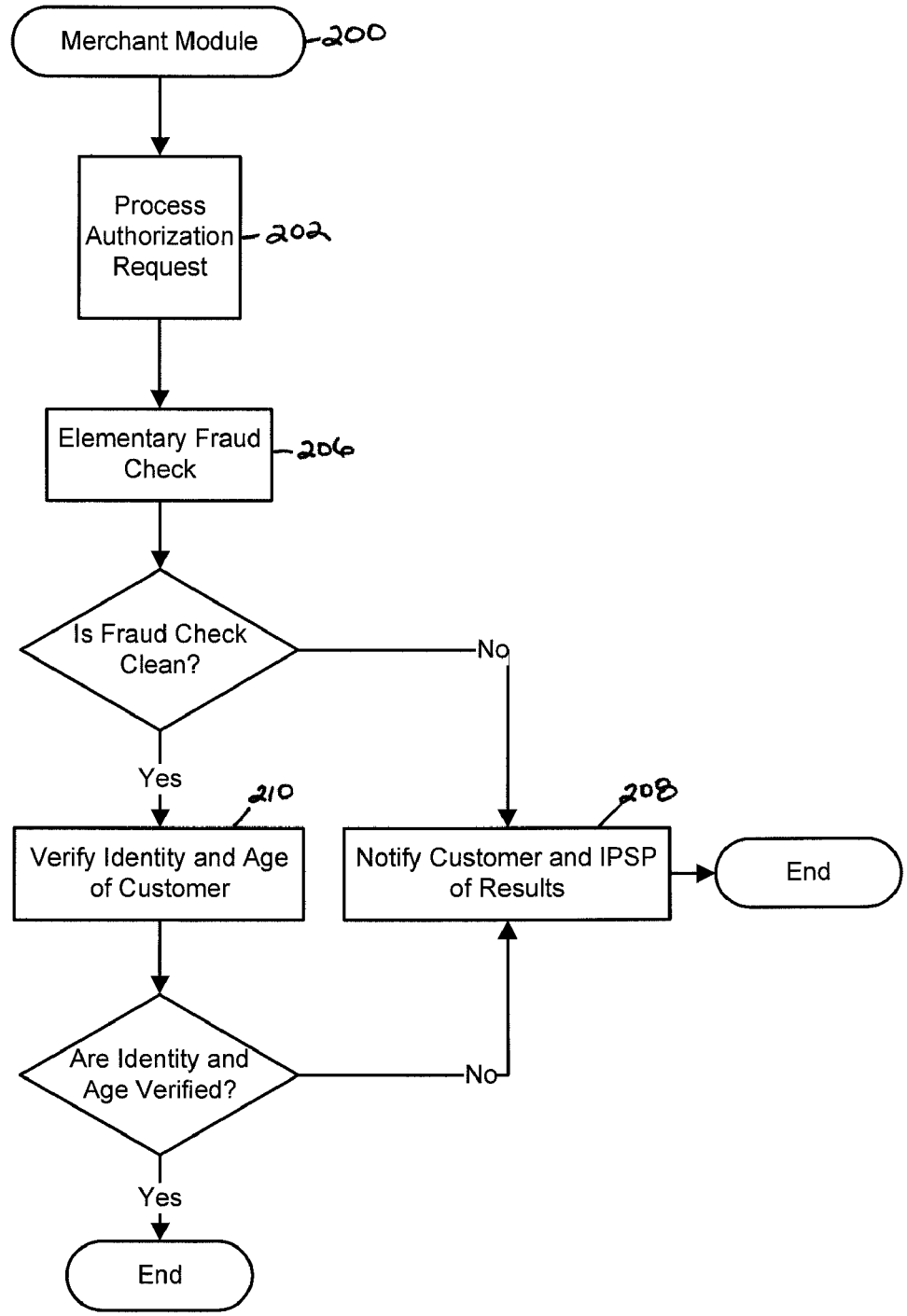
Figure 6:
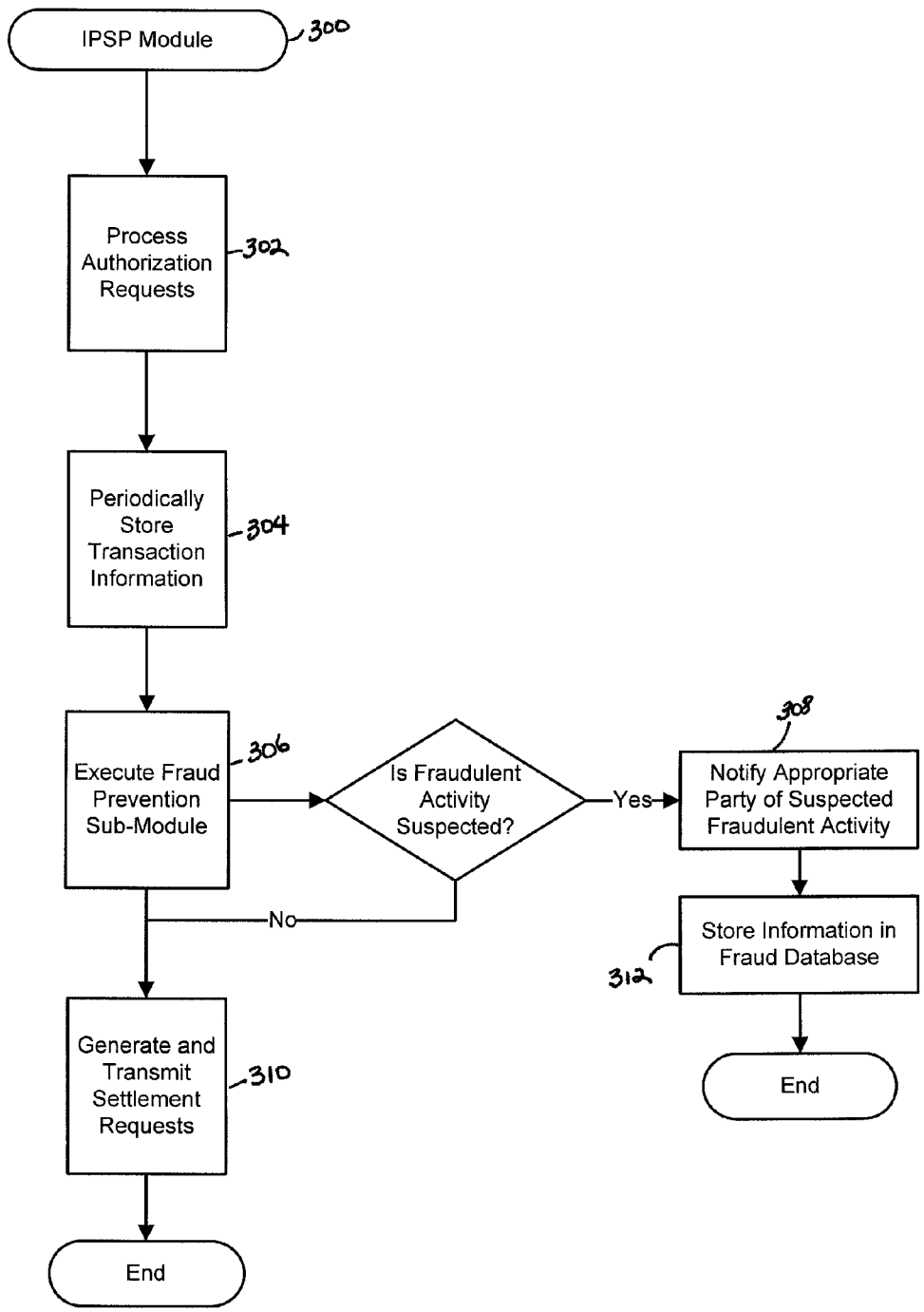
Figure 7A:
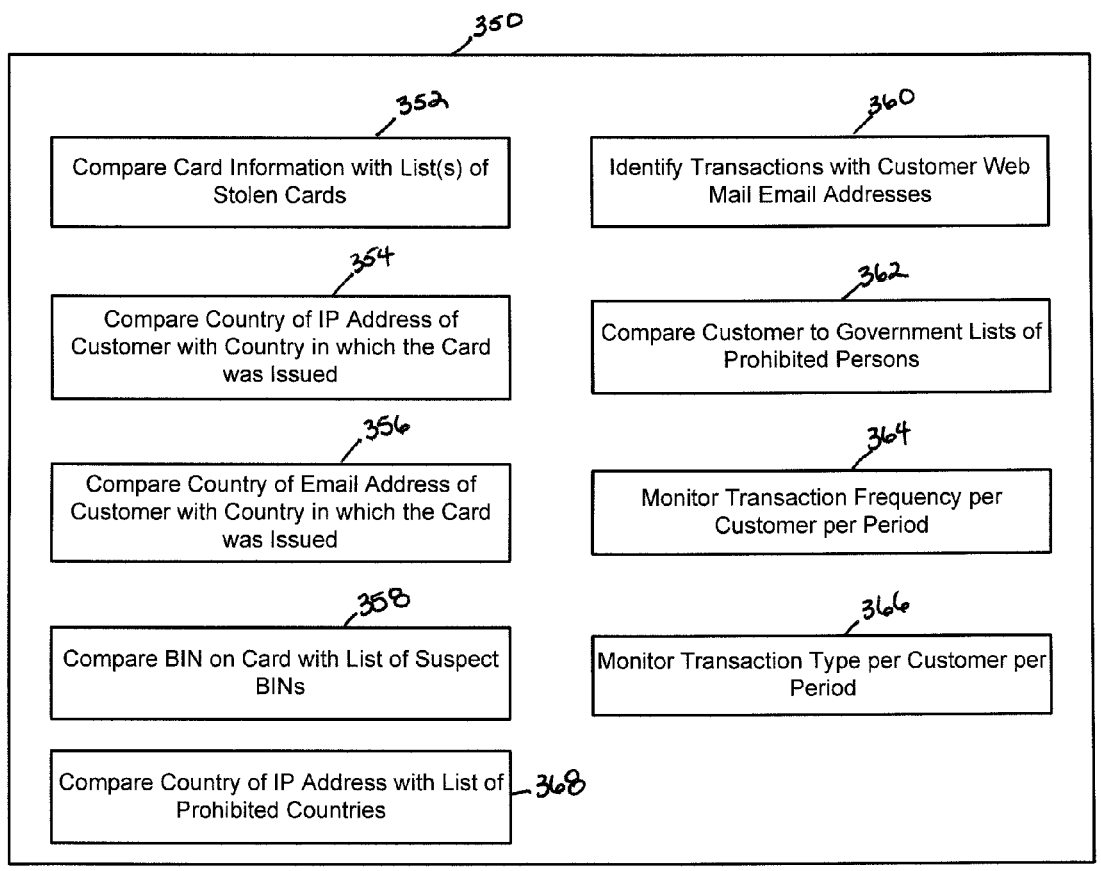
Figure 7B:
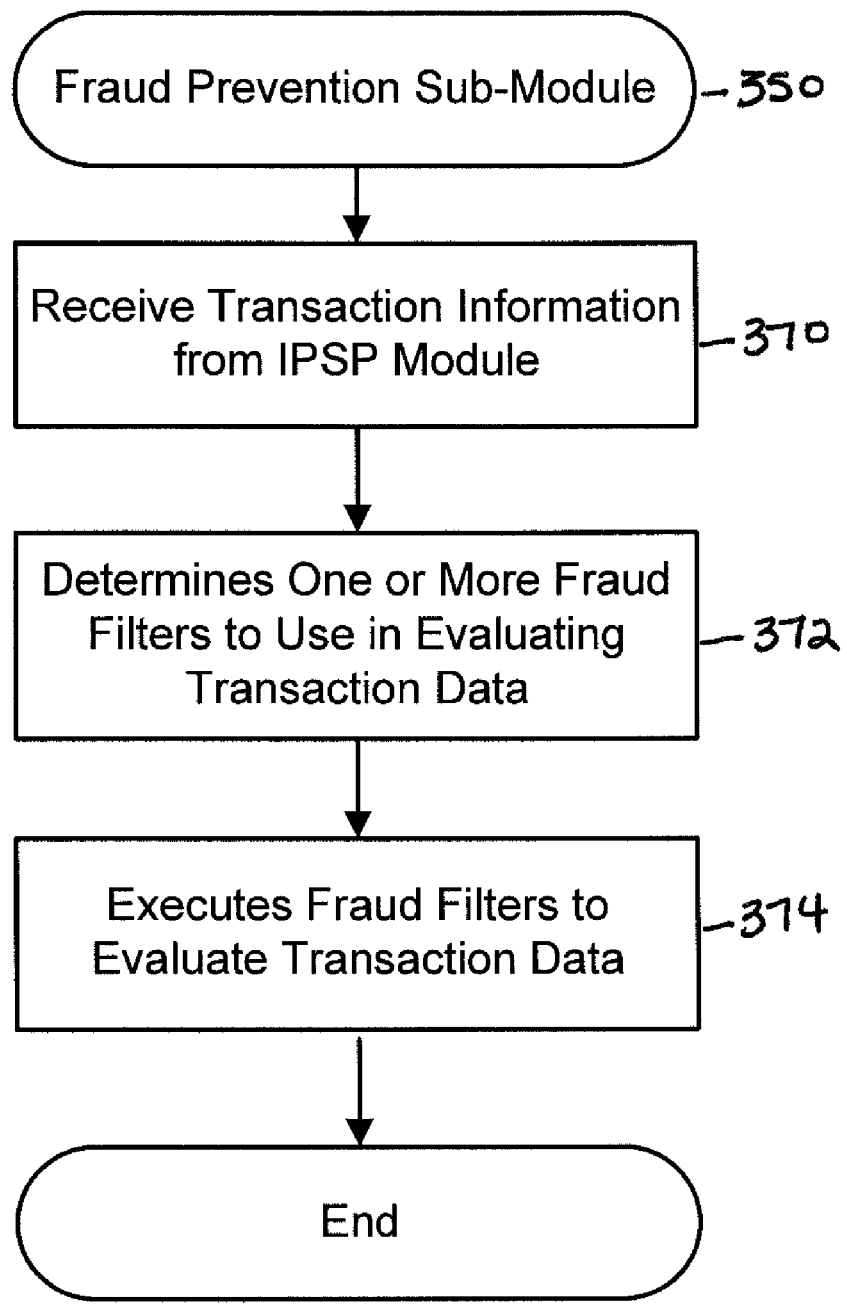
Figure 8:
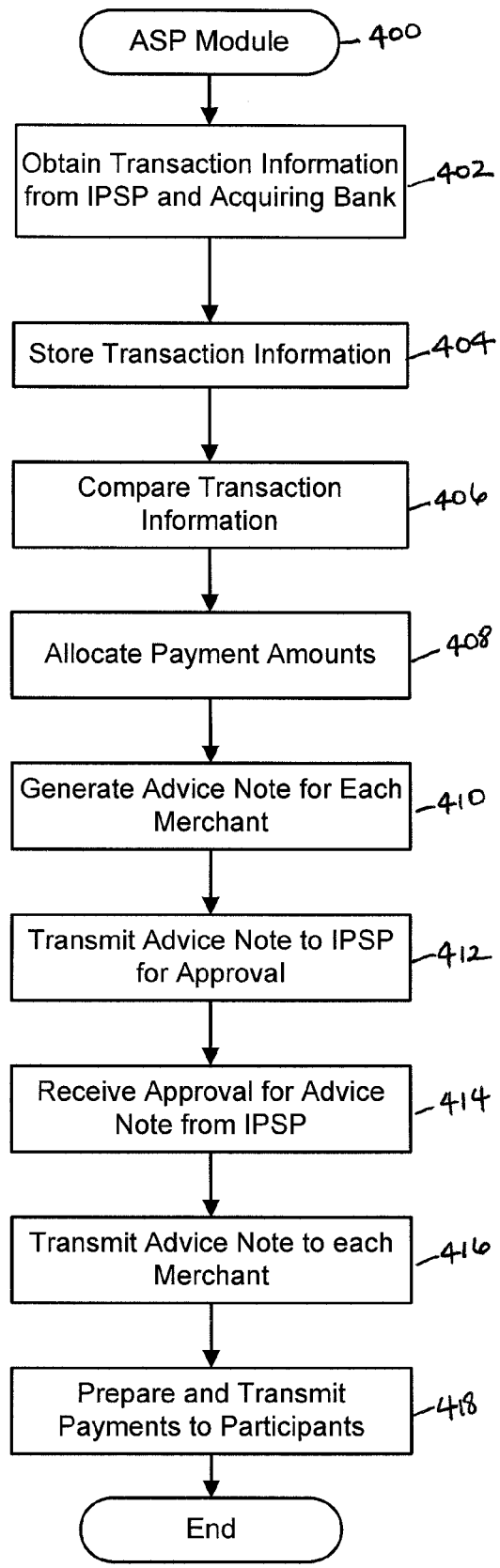
Figure 9A:
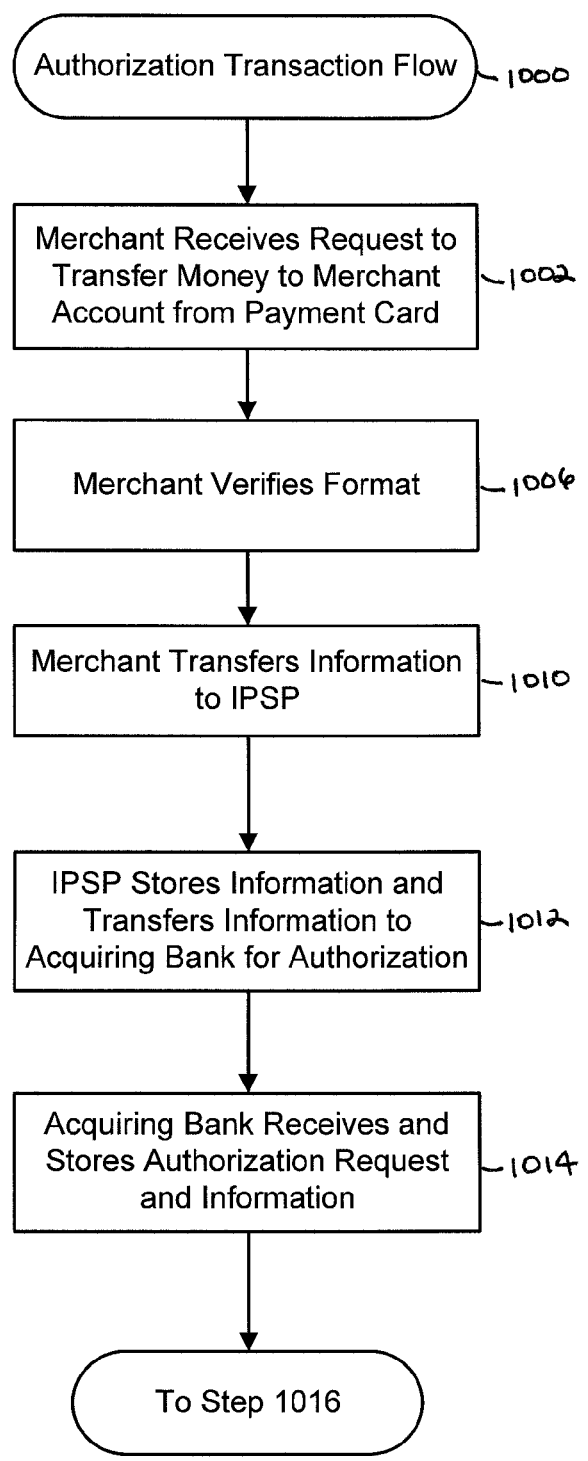
Figure 9B:
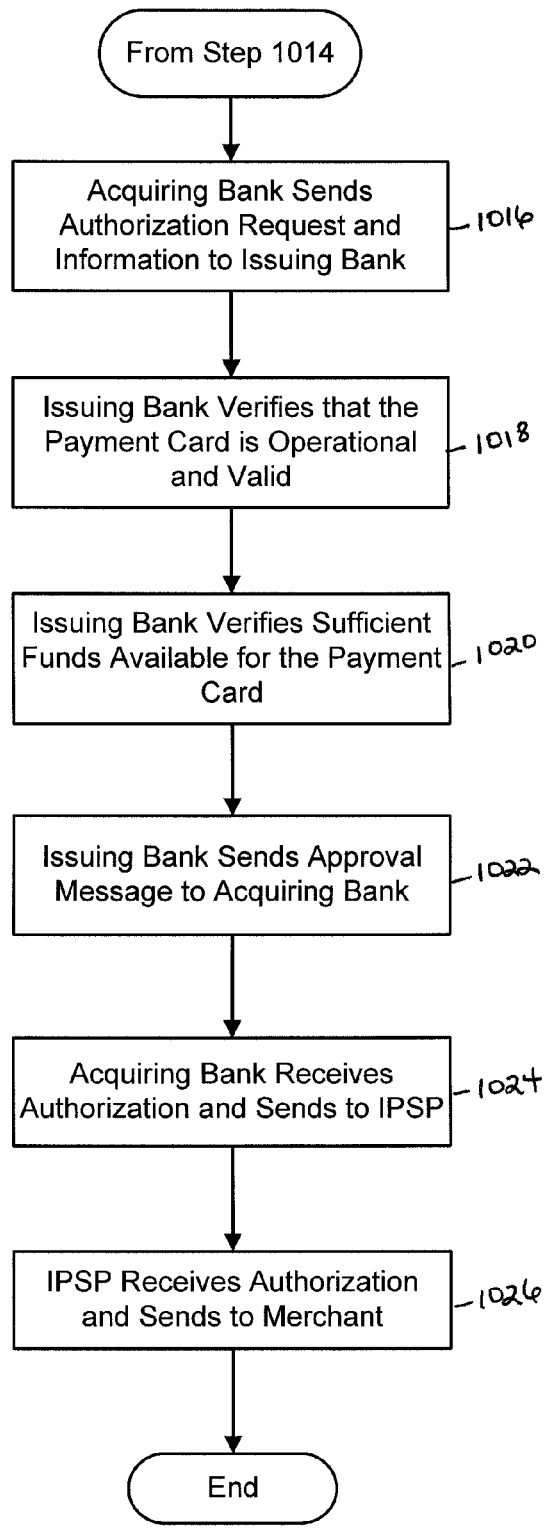
Figure 10A:
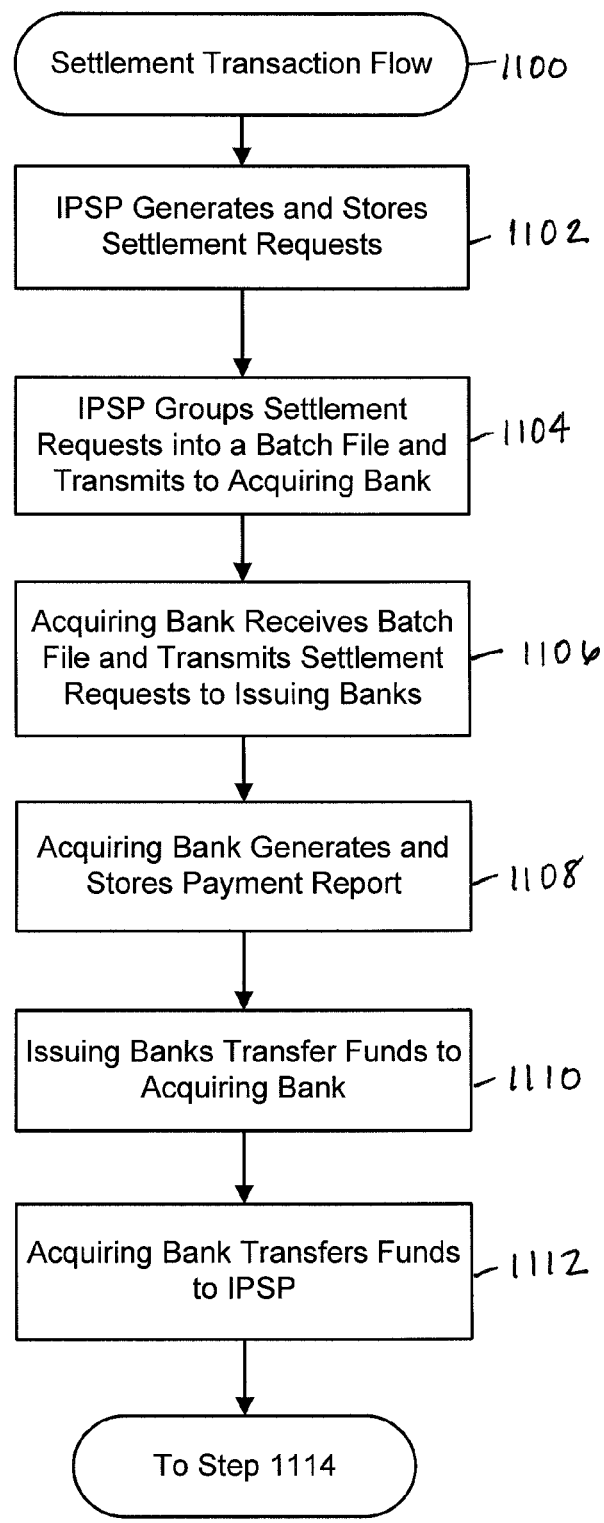
Figure 10B:
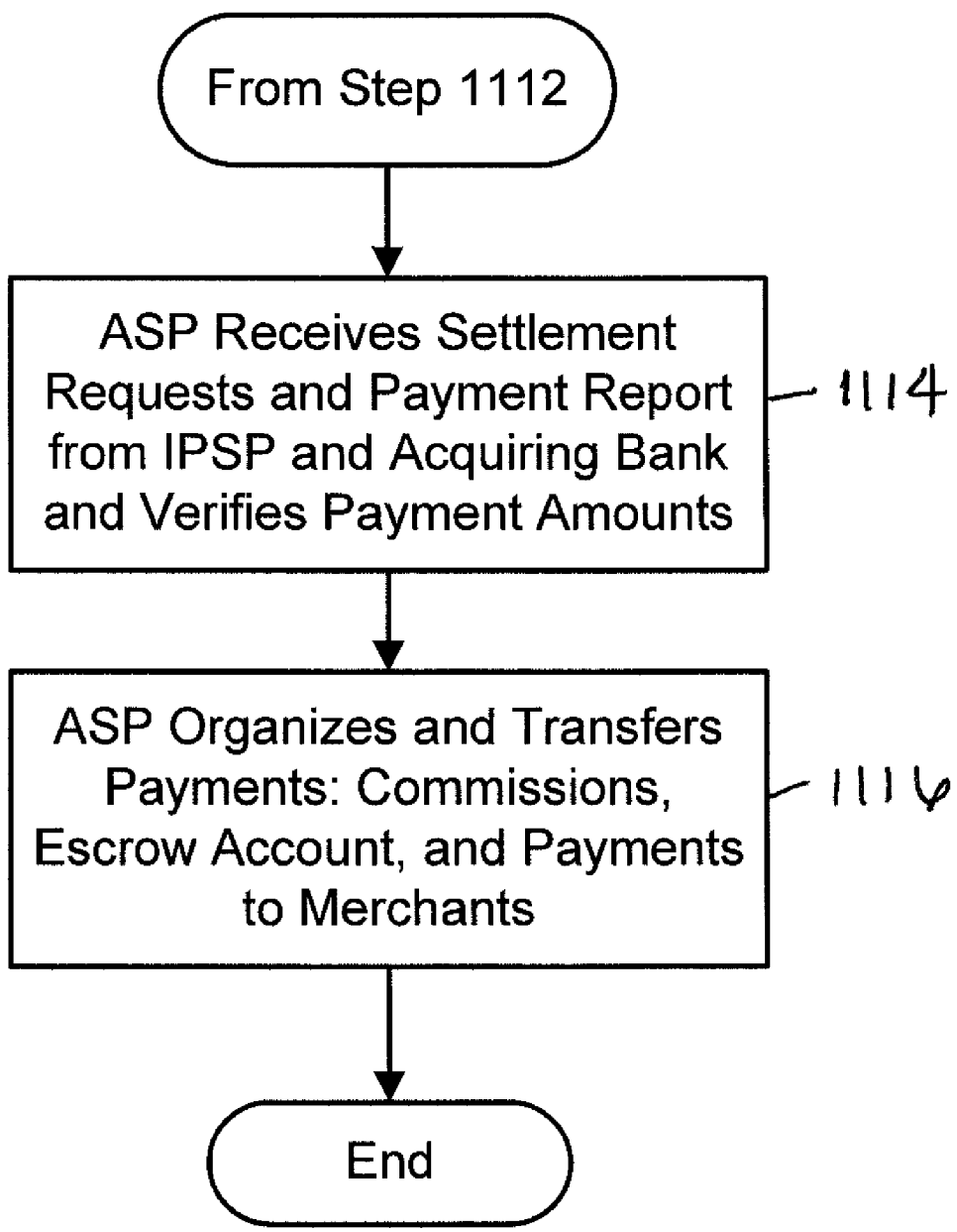
Figure 11:
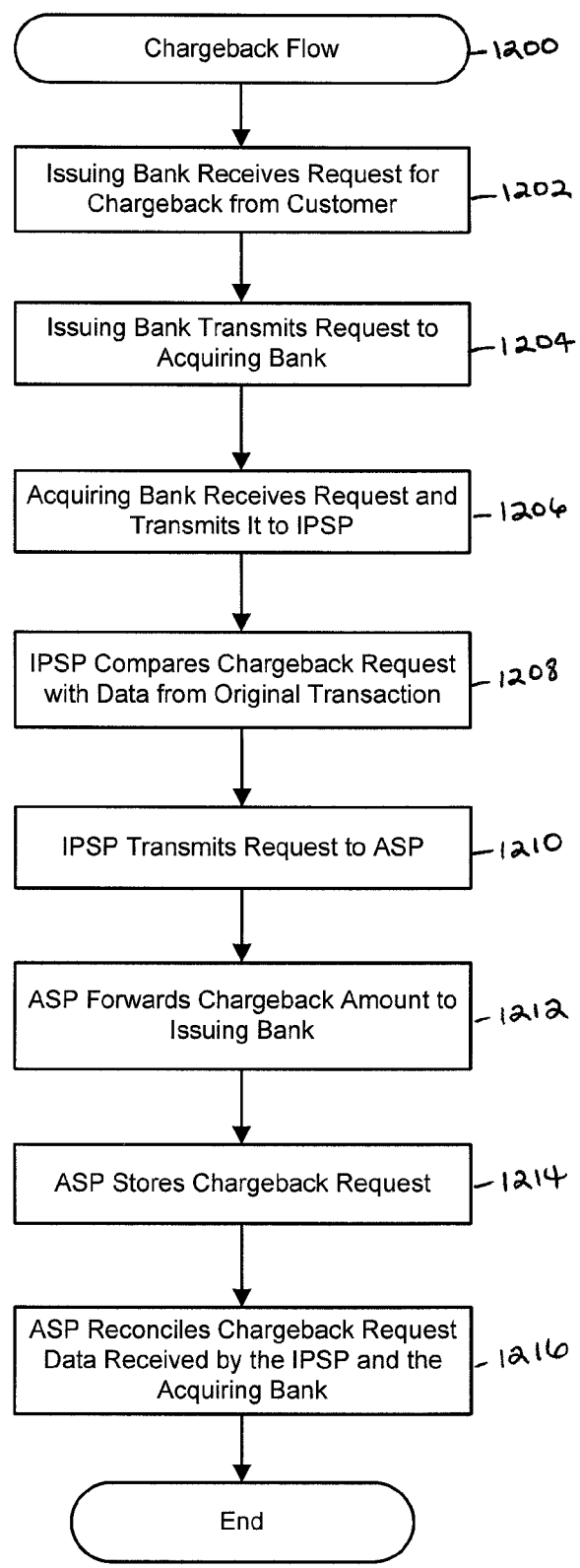
Figure 12:
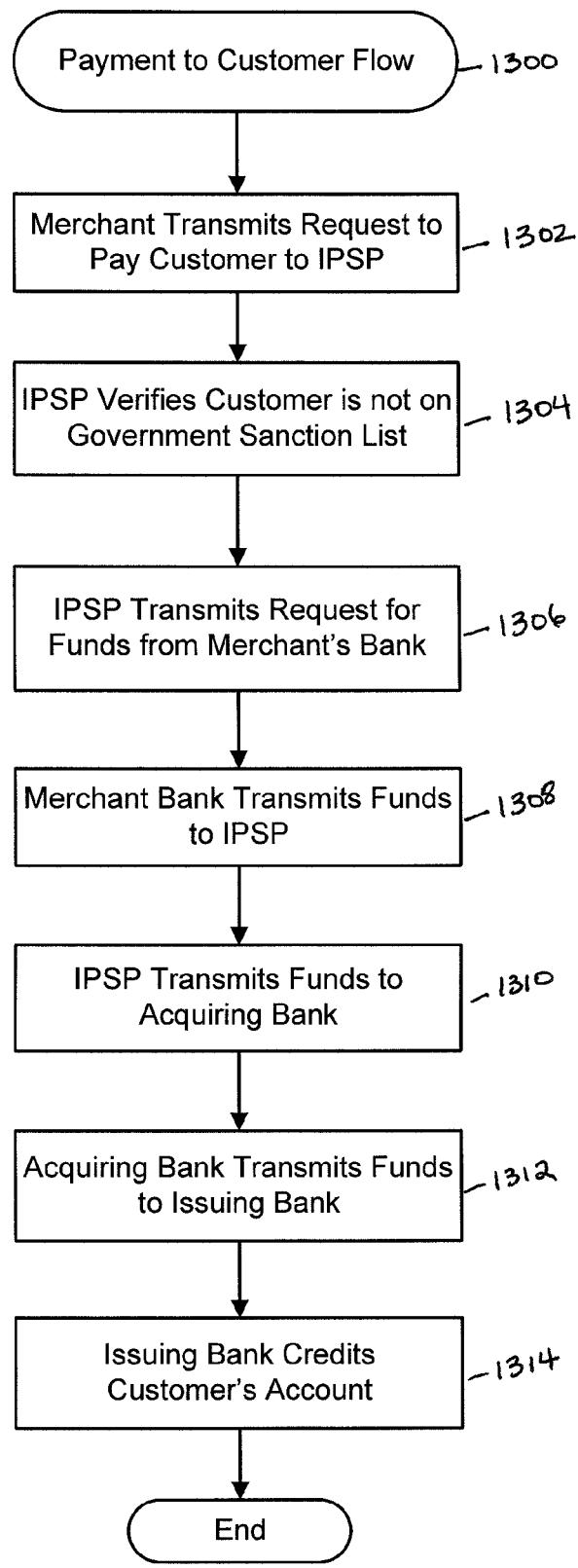

Having thus described various embodiments of the invention in general terms, reference will now be made to the accompanying drawings, which are not necessarily drawn to scale, and wherein:

FIG. 1 is a high-level block diagram of a financial transaction processing system in accordance with various embodiments of the present invention;

FIG. 2 is an illustration of various contractual relationships within the financial transaction processing system in accordance with various embodiments of the present invention;

FIG. 3A is a schematic diagram of a computing device according to one embodiment of the invention;

FIG. 3B is a schematic diagram of a computing device according to an alternative embodiment of the invention;

FIG. 4 is a schematic diagram illustrating the financial transaction processing system in accordance with various embodiments of the present invention;

FIG. 5 is a block diagram of a merchant module according to various embodiments of the present invention;

FIG. 6 is a block diagram of an IPSP module according to various embodiments of the present invention;

FIG. 7A is a block diagram of a fraud prevention sub-module according to various embodiments of the present invention;

FIG. 7B is a flow diagram of a fraud prevention sub-module according to various embodiments of the present invention;

FIG. 8 is a block diagram of an ASP module according to various embodiments of the present invention;

FIGS. 9A and 9B are flow diagrams of an authorization transaction process according to various embodiments of the present invention;

FIGS. 10A and 10B are flow diagrams of a settlement transaction process according to various embodiments of the present invention;

FIG. 11 is a flow diagram of a chargeback transaction process according to various embodiments of the present invention; and FIG. 12 is a flow diagram of a customer payment transaction process according to various embodiments of the present invention.

Figure 13:
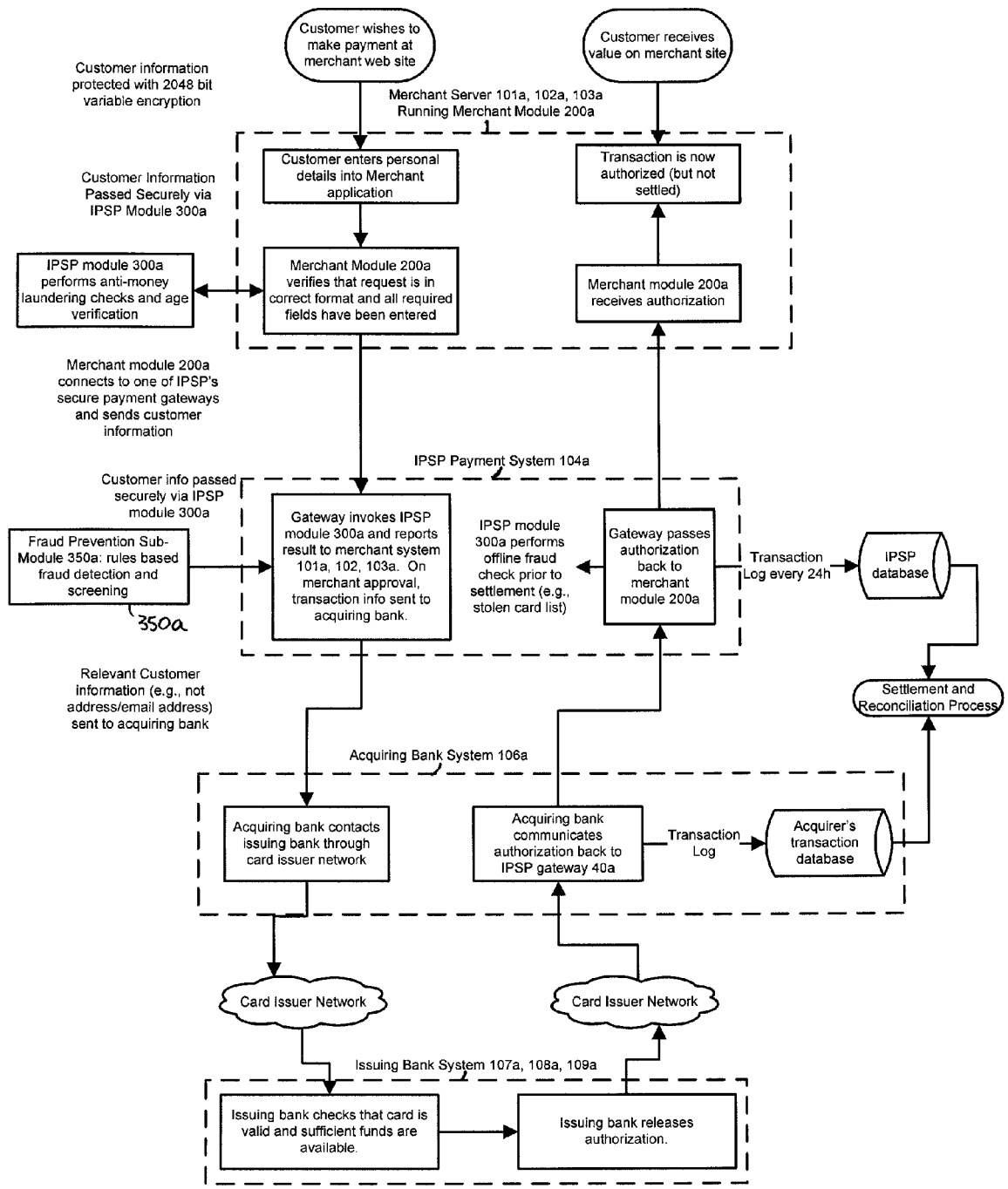

FIG. 13 is a flow diagram of an authorization transaction request process according to one embodiment of the invention.

Figure 14:
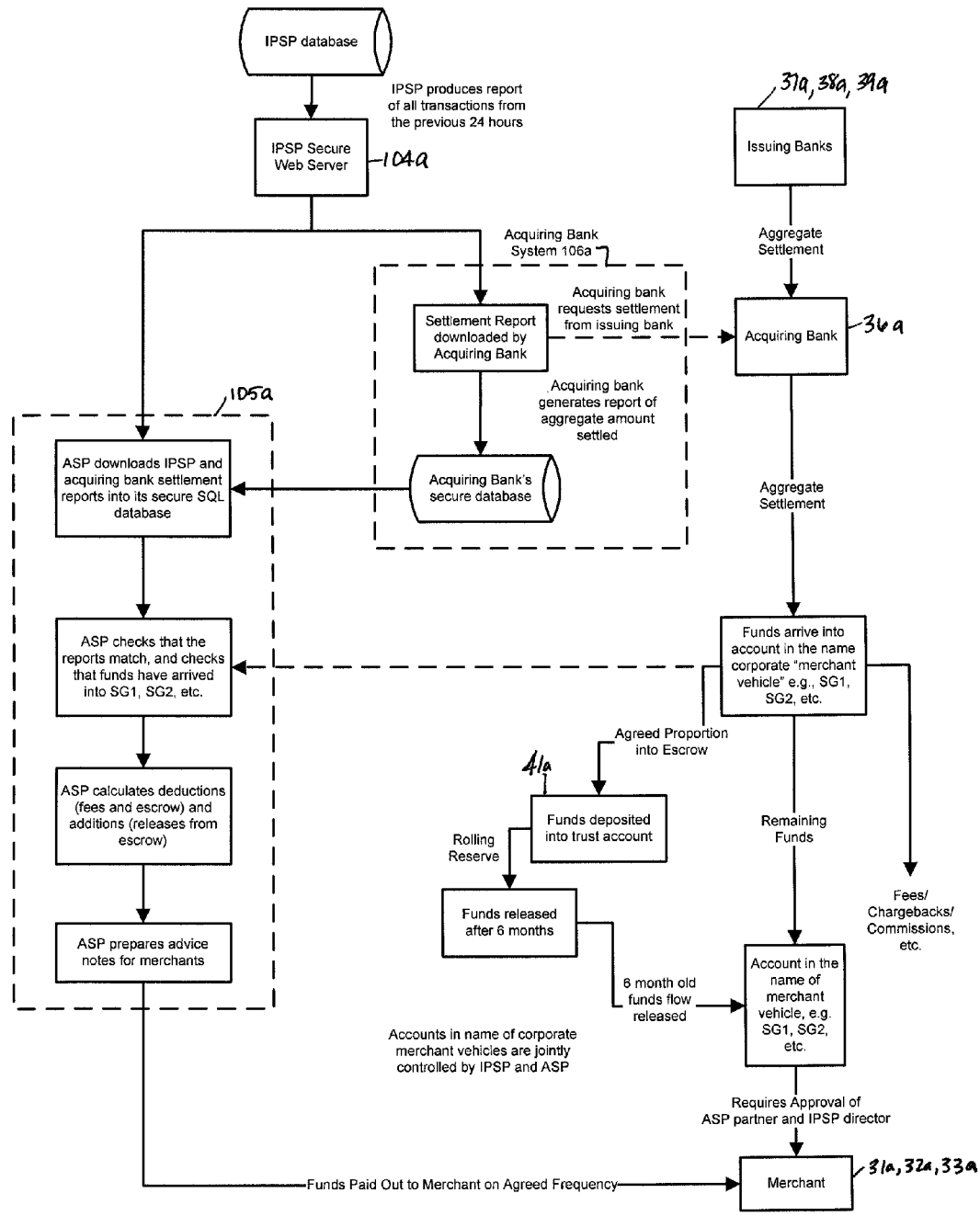

FIG. 14 is a flow diagram of a settlement transaction request process according to one embodiment of the invention.

Figure 15:
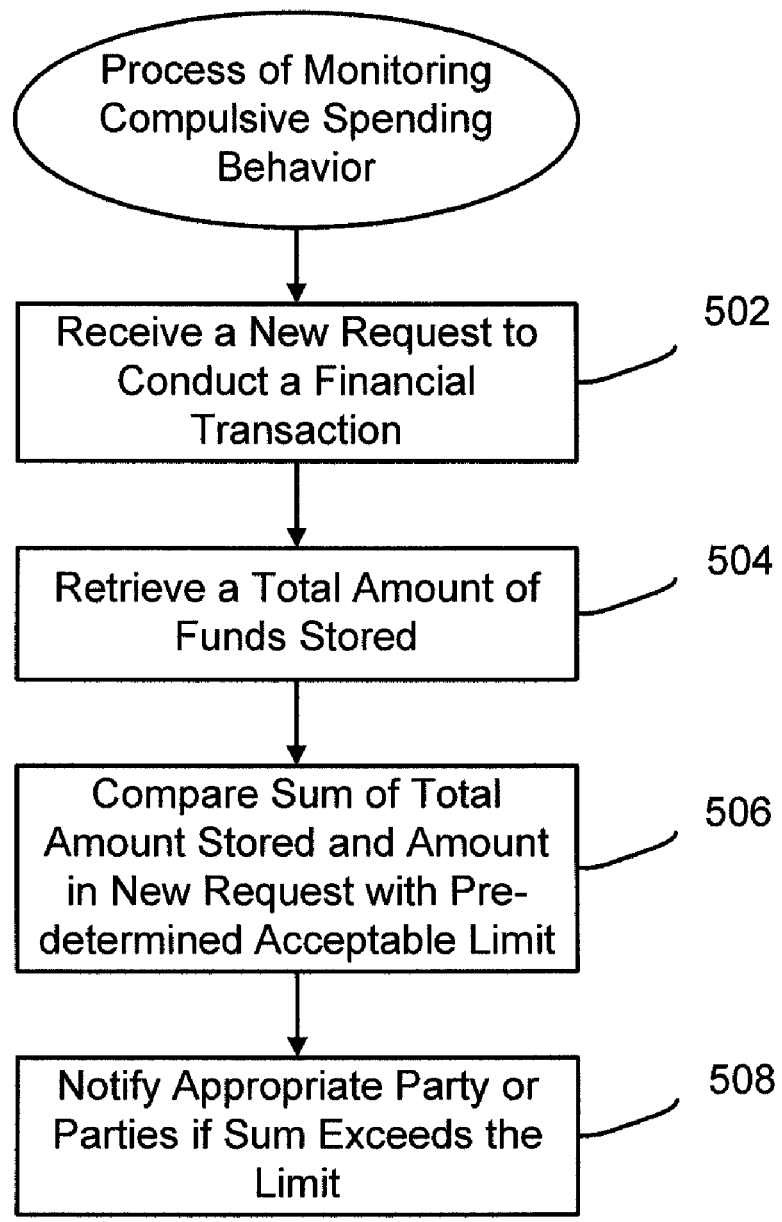

FIG. 15 is a flow diagram of a process of monitoring compulsive spending behavior according to one embodiment of the invention.

Figure 16:
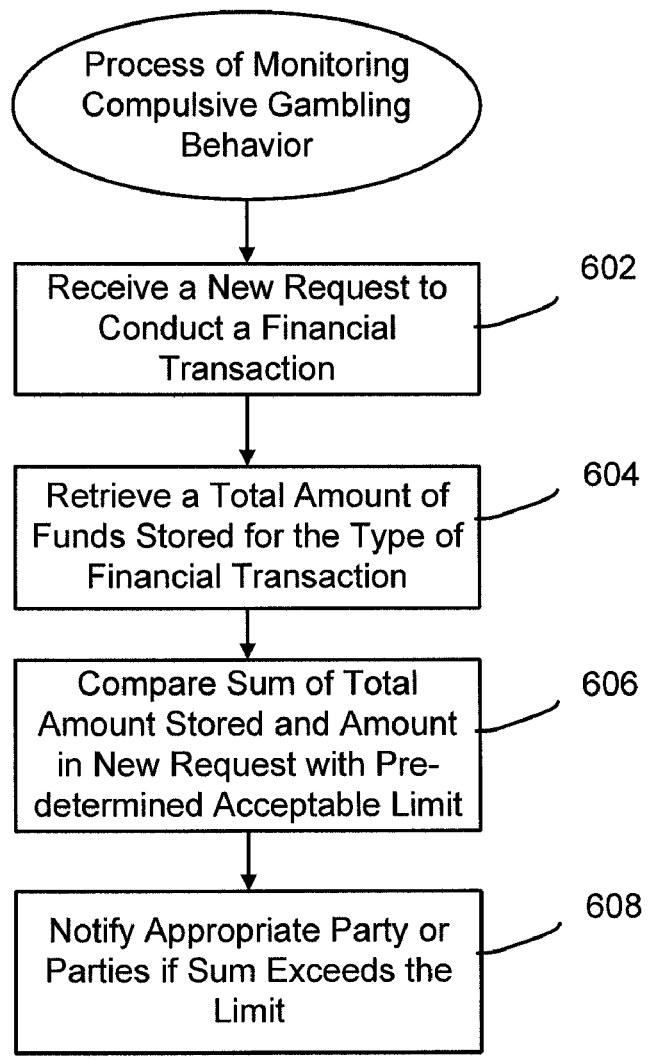

FIG. 16 is a flow diagram of a process of monitoring compulsive gambling behavior according to one embodiment of the invention.

Figure 17:
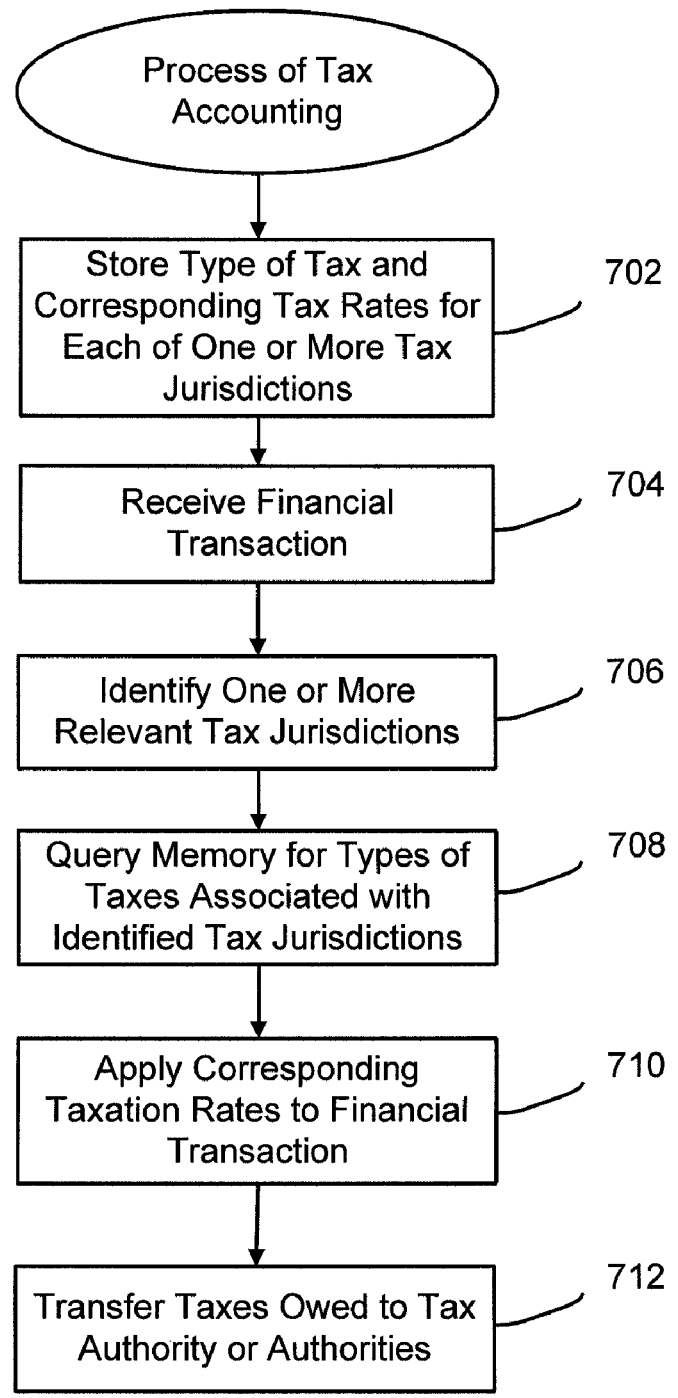

FIG. 17 is a flow diagram of a process of determining any taxes owed on a financial transaction according to one embodiment of the invention.

Figure 18:
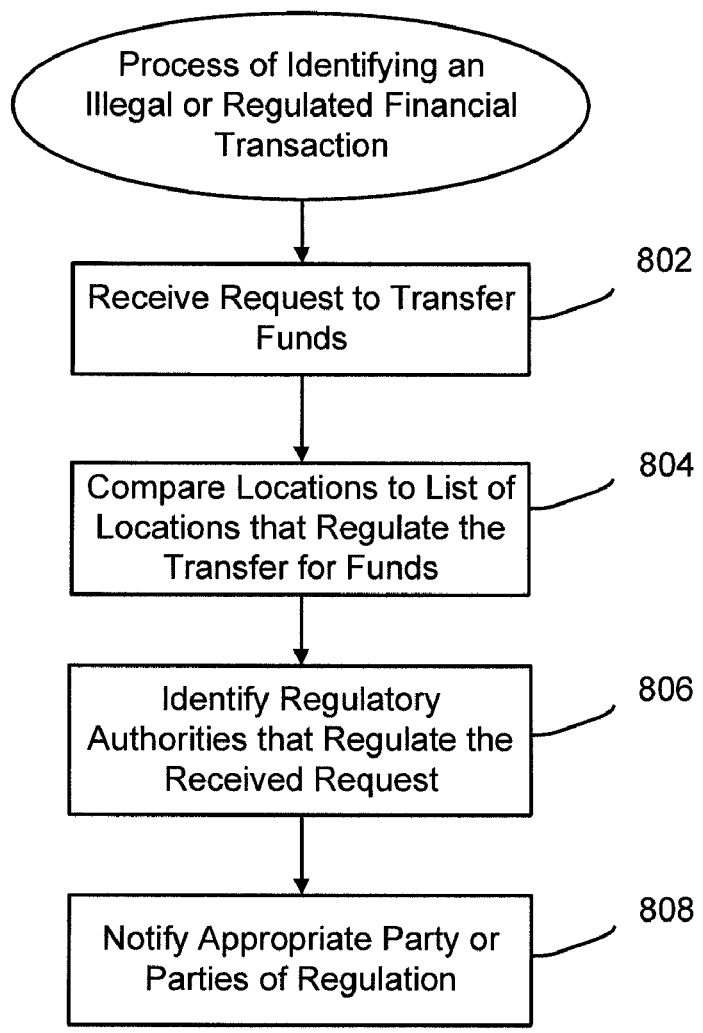

FIG. 18 is a flow diagram of a process of identifying financial transactions that are illegal or subject to regulation according to one embodiment of the invention.

DETAILED DESCRIPTION OF VARIOUS EMBODIMENTS OF THE INVENTION

Various embodiments of the present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

Brief Overview

In general, various embodiments of the invention provide an improved financial transaction processing system for e-commerce sectors that (1) more securely processes payment transactions, (2) helps to protect merchants and banks against fraudulent transactions, money laundering, and underage gambling, and (3) helps to limit other abuses in areas of e-commerce that are perceived to pose special risks, such as Internet gaming, travel, and consumer purchasing of electronic goods. To accomplish the above goals, various embodiments of the financial transaction system (1) establish operating and processing protocols for merchants, Internet payment service providers, acquiring banks, and card schemes and (2) provide improved automated systems for monitoring and processing payment and related financial transactions.

For example, in various embodiments of the invention, a rolling reserve escrow account is set up for each merchant and funded in a manner that reduces the risk of loss to an acquiring bank or an issuing bank. For example, the risk of loss is reduced according to one embodiment by ensuring that sufficient funds are available for processing payback (e.g., chargeback and refund) requests received by the merchant. According to one embodiment, a certain percentage of the funds paid to the merchant is reserved and transferred to the escrow account for a certain period of time (e.g., 6 months, 1 year, or 3 years), and if the funds are not used during the time period, the funds are transferred back to the merchant. Because the money to fund the rolling reserve escrow account is taken out of the merchant's potential profits, using the merchant's business for money laundering schemes may be less attractive. In addition, according to various embodiments, the grounds on which a merchant can dispute chargeback requests are limited such that acceptable grounds for dispute do not substantially increase the risk of loss to the acquiring bank or the issuing banks (e.g., transactions that have been marked with a fraud flag). In another embodiment, the merchant may not be allowed to dispute chargeback requests on any grounds. Thus, according to various embodiments, the rolling reserve escrow account ensures a source of funds for processing payback requests, which decreases the risk of loss to customers and may increase the likelihood that customers will use engage in online financial transactions. Furthermore, when payback requests are funded by the merchant, the risk of loss for acquiring banks and issuing banks is decreased and may result in more favorable business terms for the merchant (e.g., lower transaction rates or lower chargeback rates).

As another example, in various embodiments of the invention, the participants in the financial transaction system require each other to be in compliance with the local regulatory authority. For example, in one embodiment, if a merchant is out of compliance, an Internet payment service provider (which is discussed in more detail below), acquiring banks, and card schemes may refuse to do business with the merchant. Alternatively, in one embodiment, the participants may fine the non-complying participant. Furthermore, customers may also refuse to do business with non-complying merchants. By establishing this protocol, the financial transaction system tends to provide a market incentive for participants to remain in compliance with the local regulatory authority.

Participants of the financial transaction system may include, according to various embodiments of the invention, online customers, online merchants, an Internet payment service provider (IPSP), an acquiring bank, issuing banks, or card schemes. The IPSP operates between the merchant and the acquiring bank to provide payment related services to the merchants and interface between the merchants and an acquiring bank over the network. In addition, the IPSP may contract with an accounting services provider (ASP) to provide accounting management services related to the payment services that the IPSP provides to the merchants.

FIG. 1 illustrates a high-level schematic diagram of how the various participants interface with each other according to various embodiments of the invention. For example, participants may exchange transaction information electronically over a network (e.g., the Internet, a private network, or a private LAN network). In particular, the transaction information may include an authorization request from the merchant to transfer money from the account associated with the customer's payment card to the merchant's account, an authorization message from the issuing bank authorizing the transfer of money from the customer's account to the merchant's account, a payback (e.g., chargeback or refund) request from the issuing bank requesting money be transferred from the merchant's account to the customer's account, and settlement requests for each merchant for all transactions processed during a particular time period (e.g., 24 hours, 48 hours, or a week).

Although the embodiments discussed above describe using a payment card (e.g., debit card, credit card, prepaid card, or proximity card) associated with an account to purchase goods and services from an online merchant, it will be understood that in various other embodiments, other types of payment modes can be used to make purchases. For example, alternative payment modes may include using payment tokens associated with an account (e.g., physical or electronic tokens) or using a number associated with an account (e.g., an account number and password for accessing the account). Other payment modes may involve authorizing payment by use of biometric data associated with an account, such as, for example, iris scans, finger print, and voice recognition. Payments may also be authorized by a combination of an account number and a one time password that may be supplied by a token or via telephone, email, or short message service ("SMS").

As discussed briefly above, the financial transaction system according to various embodiments provides (1) operating and processing protocols for participants and (2) automated monitoring and processing systems (e.g., computer software and/or hardware) that are adapted for processing financial transactions with a high level of security. These protocols and automated systems serve to protect customers and participants from fraudulent transactions and other abuses that may create risks in e-commerce transactions. Various examples of protocols that may be implemented by the system are described in detail below in Section A., and various embodiments of automated systems are described in Section B. below. Exemplary flows of various transactions that may be processed through the financial transaction system are described in more detail in Section A. Exemplary Protocols Various embodiments of the financial transaction system provide operating and processing protocols for the participants. According to various embodiments, the protocols serve to deter organized crime and money laundering schemes using the merchant's business, reduce the risks of fraud and unauthorized transactions typically associated with online financial transactions and reduce the risk of loss to the acquiring bank and issuing banks, and increase the likelihood of compliance with government or local regulatory regulations. For example, according to various embodiments of the invention, the participants should be able to demonstrate compliance with the local or jurisdictional regulatory authority and should maintain auditable records of transactions processed for a particular time period (e.g., 2 years, 3 years, or 5 years). In addition, protocols may require each participant to demonstrate compliance with local regulatory requirements before entering into contracts with other participants, and protocols may require participants to verify periodically that the other participants are in good standing with the local regulatory authority. Various exemplary protocols that may be established for the merchant and IPSP are described below.

Merchant

According to various embodiments of the invention, the merchant may be required to fully disclose the identity of company directors, officers, and beneficial shareholders and report any changes to the IPSP. Requiring that this list be provided and comparing the list to a list of people and entities suspected to be involved with organized crime may help deter organized crime rings from using the merchant's business for money laundering or other illegal purposes.

In addition, according to various embodiments of the invention, the merchant may be required to take one or more steps that help to reduce the risk of loss from fraudulent transactions to the acquiring banks, issuing banks, and customers. For example, according to various embodiments, the merchants may be required to (1) demonstrate compliance with all relevant regulatory requirements, (2) pay a penalty payment when any contractual obligations are breached, (3) use address verification, age verification, and identity verification software on the merchant's computing device to verify payment information and customer information provided during online transactions, (4) perform an initial fraud check on payment and customer information received and perform random or periodic checks thereafter, or (5) provide notice to a customer that is accessing the system using an IP address or that provides a billing address that is associated with a jurisdiction in which the transaction is considered illegal.

Furthermore, according to various embodiments, the merchant may be required to implement protocols that mitigate the risk of abuse associated with the merchant's business, if any, or the perceived social impact of conducting business with the merchant (e.g., compulsive spending if the merchant is an online gaming merchant or an adult entertainment provider). For example, the merchant may be required to provide advice and help resources regarding the social impact of its business (e.g., a toll free telephone number for a help line, a website that offers helpful information, or contact information for a counselor). Furthermore, according to one embodiment, the merchant may be required to provide the merchant's name and a free telephone number on the customer's payment card statement for customers to call customer service and query about the transaction. A customer service representative should be available 24/7, according to various embodiments of the invention.

IPSP

According to various embodiments of the invention, the IPSP may be required to implement one or more of the following security features to help deter organized crime rings or others from using the merchants business for money laundering purposes and to reduce the risks associated with online financial transactions for the various participants: (1) setting up a rolling reserve escrow account, such as the escrow account discussed above, for each merchant from which it will process payback requests, (2) monitoring transactions to identify suspicious activity, (3) monitoring the frequency and value of transactions on a per payment card basis, (4) keeping transactions for each merchant (or website) in separate streams for tracking and auditing purposes, (5) saving transaction information periodically (e.g., every 2 seconds or every 10 seconds) to create an audit trial and storing the transaction information for a particular time period (e.g., 1 year, 2 years, or 5 years), (6) verifying the identify of card holders, (7) requiring merchants to disclose company directors and beneficial shareholders to the IPSP, (8) limiting the payment of winnings from Internet gambling merchants to the card holder and screening names of payees against applicable sanction lists (e.g., "Specially Designated Nationals list" in the U.S.), (9) requiring merchants to be licensed under applicable local laws and regulations and remain in good financial and legal standing, (10) penalizing merchants that are found to be in breach of the contractual obligations (e.g., by terminating the contract with the merchant or fining the merchant), (11) using several Tier 1 acquiring banks operating in well-regulated jurisdictions and be certified by them, (12) requiring merchants to implement policies, procedures, and standards aimed at keeping cardholder information secured (e.g., being certified by VISA's Account Information Security ("AIS") program), and (13) operating and applying recommendations of the Financial Action Task Force on Money Laundering (e.g., www.FATF-GAFI.org) (see, for example, "Anti-Money Laundering/Combating Terrorist Financing Methodology (with FATF 40+9 incorporated)" promulgated by the International Monetary Fund), attached as Appendix A). In addition, in various embodiments, the IPSP maintains a fraud database 42, shown in FIG. 1, for storing information on transactions processed by the IPSP that appear to be or were determined to be fraudulent. The IPSP, according to one embodiment, allows other participants to utilize the fraud database when processing transactions, further reducing the risk of loss to issuing banks, acquiring banks, merchants, and customers. Although the IPSP may manage its own accounting and the fraud database, reconcile transactions it processes, and generate reconciliation reports for the merchants, the IPSP, according to another embodiment, may contract with an ASP to provide one or more of these services.

In addition, exemplary protocols according to one embodiment of the invention may require that the IPSP create separate corporate entities (e.g., SG1, SG2, SG3, etc.) for each merchant, and that these corporate entities operate under the direction of the IPSP and/or ASP to manage the funds received for the particular merchant associated with the corporate entity, which is discussed in more detail in relation to FIG. 14. According to various embodiments, this corporate structure isolates the operation of each merchant. In addition, according to various embodiments, this corporate structure provides a legal structure that ensures fair and objective control of the escrow funds being held for the protection of the financial transaction system and the customer.

Acquiring Banks

According to various embodiments of the invention, exemplary protocols may require the acquiring banks to implement one or more of the following security features to reduce the risks associated with online transactions to the issuing banks and the customers: (1) monitor the credit activity of online merchants to ensure that customers are able to receive winnings or credits from merchants onto their payment cards (e.g., the cardholder funds transfer (CFT) pilot sponsored by VISA and the Money Flow pilot sponsored by MasterCard), (2) ensure all card scheme regulations are communicated to the IPSP and merchants, (3) ensure that transaction information has correct data elements as dictated by the card schemes and issuing banks, and (4) ensure the IPSP is in compliance with the applicable regulatory schemes.

Agreements between Participants

According to various embodiments of the invention, one or more system protocols may be incorporated into agreements between the participants to ensure compliance with the established protocols. For example, FIG. 2 illustrates a schematic diagram of contractual relationships among the participants according to various embodiments of the invention. In particular, the acquiring bank 36, the IPSP 34, and each merchant 31, 32, 33 may enter into a three-way processing contract 45 that sets forth the obligations of each party with respect to how transactions are processed. This agreement 45 may require each party to remain in good standing with the local regulatory authority, provide an updated list of officers, directors, and beneficial shareholders to the other parties, perform certain identity verification and fraud checks on transaction information, and store transaction information for a particular time period (e.g., for 1 year, 3 years, 5 years) for auditing purposes. In addition, according to one embodiment, the agreement 45 may include one or more grounds on which the merchant may dispute a chargeback request. According to another embodiment, the agreement 45 may establish a fee chargeable to the merchants 31, 32, 33 for chargebacks.

In addition, the acquiring bank 36 and the IPSP 34 may enter into a trust agreement 47 that sets forth the particular fraud checks that the IPSP should perform on transaction data and when the IPSP should request settlement on behalf of each merchant (e.g., daily or weekly).

The ASP 35 and each merchant 31, 32, 33 may enter into an escrow agreement 49 that sets forth how the ASP will manage the rolling reserve escrow account on behalf of the merchant (e.g., the percentage of funds to be taken out for the escrow account, the length of time the funds are stored in the escrow account, or the format of reconciliation reports).

Furthermore, the ASP 35 and the IPSP 34 may enter into a service agreement 43 that sets forth the obligations of each party with respect to the accounting services provided by the ASP to the IPSP (e.g., the formats of and accessibility of data exchanged between the ASP and IPSP, the types and formats of summary reports generated by the ASP for or on behalf of the IPSP 34, the calculation of fees payable to one or more participants, or the approval procedures for approving reconciliation reports for the merchants). In addition, in one embodiment, the ASP 35 may be required by the agreement 43 to respond to queries from merchants 31, 32, 33 about transactions processed by the IPSP 34 or on behalf of the IPSP 34 by the ASP 35. Furthermore, in another embodiment, the ASP 34 may be required to (a) identify all transaction data processed by the ASP 35 on behalf of the IPSP 34 that is related to chargeback requests and (b) forward the identified data to the merchant 31, 32, 33 to ascertain what, if any, further actions the merchant 31, 32, 33 wishes to take with respect to the chargeback request.

B. Automated Systems for Monitoring and Processing Transactions

As will be appreciated by one skilled in the art, the present invention may be embodied as a method, a transaction processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions executed on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the various embodiments described herein, a "computer" or "computing device" may be referenced. Such computer may be, for example, a mainframe, desktop, notebook or laptop, a hand held device such as a data acquisition and storage device, or it may be a processing device embodied within another apparatus such as, for example, a wireless telephone. In some instances the computer may be a "dumb" terminal used to access data or processors over a network. Turning to FIG. 3A, one embodiment of a computing device is illustrated that can be used to practice aspects of various embodiments of the invention. In FIG. 3A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In various embodiments, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In various embodiments, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Furthermore, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1xEV-DO, GPRS, W-CDMA, or other protocol.

An alternative embodiment of a processing system that may be used is shown in FIG. 3B. In this embodiment, a distributed communication and processing architecture is shown involving a server 20 communicating with either a local client computer 26*a* or a remote client computer 26*b*. The server 20 typically comprises a processor 21 that communicates with a database 22 (e.g., a SQL database), which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26*a*. These may be located in the same facility as the server, though not necessarily in the same room. Communication with remote devices typically is accomplished by routing data from the LAN 25 over a communications facility to a wide area network 27, such as the Internet. A remote client computer 26*b* may execute a web browser, allowing the remote client 26*b* to interact with the server as needed by transmitting data through the wide area network 27, over the LAN 25, and to the server 20. In addition, the web browser may include a user interface developed in Java Script and Microsoft.net for example.

Those skilled in the art of data networking will realize that many other alternatives and architectures are possible and can be used to practice various embodiments of the invention. The embodiments illustrated in FIGS. 3A and 3B can be modified in different ways and be within the scope of the invention.

FIG. 4 illustrates computing devices 101-109 that are associated with each participant and that are in communication with each other via one or more networks 115 (e.g., private networks, private LAN networks, or the Internet) according to various embodiments of the invention. For example, according to one embodiment, the IPSP 34 may establish an IPSP network that is accessible to merchants 31, 32, 33 and the acquiring bank 36 through IPSP gateways 40 that connect the IPSP network to the networks utilized by the merchants 31, 32, 33 and acquiring banks 36. According to various embodiments, the IPSP gateways 40 may be implemented completely as hardware, completely as software, or as a combination of both. In one embodiment, IPSP gateways 40 ensure the security of the information being transmitted to and from the IPSP 34 by selectively allowing access to the IPSP network. For example, merchants 31, 32, 33 or acquiring banks 36 that do not have a contractual relationship with the IPSP 34 may be denied access to the IPSP network by the IPSP gateways 40.

In addition, the acquiring banks 36 may utilize card scheme networks to exchange information with the issuing banks 37, 38, 39 according to various embodiments of the invention. Examples of card scheme networks include, but are not limited to, the VISA, MasterCard, and American Express networks.

As discussed above in relation to FIGS. 3A and 3B, according to various embodiments, the merchants 31, 32, 33, IPSP 34, ASP 35, acquiring bank 36, and issuing banks 37, 38, 39 may be associated with one or more computing devices (e.g., one or more servers, SQL servers, or web servers) and one or more of these computing devices may include an automated system for processing financial transactions. For example, the system 100 provides a merchant module 200 configured to operate on the merchants' systems 101, 102, 103, an IPSP module 300 configured to operate on the IPSP's system 104, and an ASP module 400 configured to operate on the ASP's system 105. These modules 200, 300, 400 automate processing functions for each participant, according to one embodiment. These modules may be implemented completely as hardware, completely as software, or as a combination of both.

In addition, according to one embodiment, the ASP module 400 may be configured to operate on an ASP system 105 if the IPSP 34 contracts with an ASP 35 to provide accounting related services, or, in another embodiment, the ASP module 400 may be configured to operate on the IPSP's system 104. Various embodiments of these modules are described in more detail below in relation to FIGS. 5-8.

Merchant Module

FIG. 5 illustrates a block diagram of a merchant module 200 according to various embodiments of the invention. According to various embodiments, the merchant module 200 operates on the merchant system 101, 102, 103 and automates at least a portion of the steps that a merchant performs to process transactions. For example, the merchant module 200 is configured to process authorization requests, which is shown as step 202. In step 202, the merchant module 200 receives payment information from a customer, which may include some or all of the customer's full name and billing address, email address, credit card number, CVV2 number, payment amount, or card issuer name. The merchant module 200 then verifies the format of the payment information received, such as verifying whether the credit card number is a valid number and whether all fields have been completed. The merchant module 200 may further be configured to compare the customer information with previously stored identifications and passwords associated with 3-D secure software plug ins (e.g., Verified by Visa and SecureCode by MasterCard). If the format is correct, the merchant module 200 generates and transmits an authorization request to the IPSP system 104 for further processing.

According to various embodiments of the invention, the merchant module 200 is also configured to perform an elementary fraud check on transaction requests received, shown as step 206. The elementary fraud check step 206 may include comparing the credit card number with a list of stolen credit card numbers, verifying that the billing address provided by the customer matches the billing address for the payment card, comparing the billing address provided with a billing address that is provided when the customer initially registers with the merchant, or verifying that the card issuer name matches the banking identification number (BIN) for the card, for example. In addition, the fraud check step 206 may be performed after the authorization request is transmitted to the IPSP (step 202), as shown in FIG. 5, or prior to generating and transmitting the authorization request (not shown). In one embodiment, the fraud check step 206 is performed after the authorization request has been transmitted (step 202) but prior to settlement with the issuing bank.

If no potential problems are detected in the fraud check step 206, the merchant module 200 verifies the age and identity of the customer, shown as step 210. For example, the age may be verified by checking government records for the cardholder, such as voter registration records or driver's license records, or by establishing a network connection with an electronic age and/or identity verification service (e.g., the "URU" service provided by the UK based GB Group) and providing the customer's information to the service. The service, according to various embodiments, compares the customer's information to government or other public records to verify the customer's identity and age. In one embodiment, the merchant module 200 may perform the age and identity verification step 210 when a customer is setting up a new account with the merchant. The process of step 210 may be repeated periodically or randomly thereafter to re-verify the identity and age of existing customers. In addition, in the embodiment shown in FIG. 5, the age and identity verification step 210 is shown as occurring after the fraud check step 206 and the authorization request step 202. However, in other embodiments, the age and identity verification step 210 can occur prior to the authorization request step 202 or the fraud check step 206.

If the customer's age and identity are not verified in the age and identity verification step 210 or if the fraud check step 206 detects a potential problem for the transaction, the merchant module 200 may notify the customer that the transaction is denied and the IPSP that the transaction should be denied, shown as step 208, according to one embodiment.

In addition, the merchant module 200 according to various embodiments is configured to display or otherwise notify the customer of the amount of time spent on the merchant's website for a particular time period (e.g., per session, 24 hours, or week). Having this information may assist customers in avoiding compulsive behavior with respect to the merchant's website. Furthermore, the merchant module 200 may be configured to allow customers to access the transaction log for the customer maintained by the merchant. In addition, the merchant module 200 may be configured to implement self-regulation guidelines, such as, for example, limits on losses (e.g., gambling transactions), or the time and/or amount or money spent on the merchant's website.

To protect against money laundering, the merchant module 200 may be further configured to execute anti-money laundering software (e.g., software that compares available data to the parameters set forth in the "Anti-Money Laundering/Combating Terrorist Financing Methodology (with FATF 40+9 incorporated)" promulgated by the International Monetary Fund), attached as Appendix A) to evaluate any transaction over a selected amount (e.g., £15,000 or $20,000). The evaluation by the software may include identity verification and re-verification, followed by checks against the verified individual or company.

IPSP Module

FIG. 6 illustrates a flow diagram of an IPSP module 300 according to various embodiments of the invention. According to one embodiment, the IPSP module 300 is configured to operate on the IPSP system 104. Beginning at step 302, according to one embodiment, the IPSP module 300 processes authorization requests received from the merchant system 101, 102, 103. Each authorization request may include payment information for a particular transaction and the customer information associated with the transaction, such as the full name of the customer, the customer's email address, and the IP address of the computing device used by the customer to initiate the transaction. According to various embodiments of the invention, the IPSP module 300 then transmits the authorization request to the acquiring bank system 106, which transmits the authorization request to the appropriate issuing bank system 107, 108, 109. As discussed below in more detail in relation to FIGS. 9A and 9B, according to various embodiments, the IPSP module 300 receives an authorization message from the issuing bank system 107, 108, 109, via the acquiring bank system 106, authorizing or denying the transaction, and the IPSP module 300 transmits the authorization message to the merchant system 101, 102, 103.

According to various embodiments, in step 304, the IPSP module 300 stores transaction information (e.g., authorization requests, chargeback requests, refund requests, and settlement requests) processed by the IPSP module 300. The stored transaction information may be used for auditing purposes, monitoring the type and frequency of transactions on a per customer, per payment card, or per merchant basis, and generating settlement requests and allocating payment of funds received in response to settlement requests. For example, authorization, chargeback, and refund requests may be stored periodically, such as, for example, every second or every ten seconds, or on a per transaction basis, such as each time the IPSP module 300 receives and processes transaction information. These requests may be stored for a certain period of time (e.g., a day or a week or longer). In addition, according to various embodiments, the requests may be stored on a per merchant basis (or on a per URL (Uniform Resource Locator) if a merchant has more than one website supporting e-commerce transactions). The IPSP module 300 groups the authorization requests for each merchant into a settlement request file for each merchant periodically (e.g., daily or weekly) and transmits the settlement requests for the merchants in a batch file to the acquiring bank system 106 for settlement, which is discussed below in relation to step 310. The IPSP module 300 may store the grouped transaction information as a separate file for a certain period of time (e.g., a year, two years, or three years).

In various embodiments of the invention, the IPSP module 300 is also configured to execute a fraud prevention sub-module 350, which is shown as step 306 in FIG. 6 and discussed below in more detail in relation to FIGS. 7A and 7B, to verify that the transaction should be subject to settlement by the system 100. For example, if the payment card number is listed on a list of stolen payment card numbers, the country of the IP address of the customer does not match the country in which the payment card was issued, or the customer is on a national sanctions list (e.g., "Specially Designated Nationals list" in the U.S.), the IPSP module 300 will not present the transaction for settlement. In the embodiment shown in FIG. 6, the execution of the fraud prevention sub-module 350 is shown as occurring after the authorization request processing step 302 and the transaction information storage step 304. However, step 306 may be performed by the IPSP module 300 prior to transmitting authorization requests to the acquiring bank system 106 in step 302 or prior to storing the transaction information in step 304, according to other embodiments of the invention.

According to various embodiments of the invention, if the fraud prevention sub-module 350 detects potentially fraudulent activity for a transaction in step 306, the IPSP module 300 is configured to notify the appropriate party or parties of the suspected fraudulent activity, which is shown as step 308. The appropriate party according to various embodiments may include the acquiring bank 36 (which may pass the notification on to the issuing bank), the issuing bank 37, 38, 39 (directly), the merchant 31, 32, 33, and/or the customer. In addition, the IPSP module 300 is configured, according to various embodiments, to store information about potentially fraudulent transactions in a fraud database 42, shown as step 312. The fraud database 42 may be utilized by the IPSP module 300 to analyze subsequent transactions. In addition, in one embodiment, the fraud database 42 may be accessible to the card issuer networks and/or acquiring banks to analyze transactions received. Furthermore, the fraud database 42 may include one or more of the following fields: customer name, address, IP address, payment information (e.g., card or account number), phone number, and a code or description identifying prior fraudulent activity.

As shown in step 310, if the fraud prevention sub-module 350 does not detect any potentially fraudulent activity in step 306, the IPSP module 300, according to various embodiments, is configured to generate and transmit settlement requests to the acquiring bank system 106 or the issuing bank system 107, 108, 109. The settlement requests are based on the authorization, chargeback, and refund requests received by the IPSP module 300 within a particular time period (e.g., a day or a week). The settlement requests may include only those transactions that have not been detected as potentially fraudulent by the IPSP module 300 and the merchant module 200, according to one embodiment. Alternatively, the settlement requests may include one or more transactions that have been detected as potentially fraudulent by the IPSP module 300 or the merchant module 200, but are marked or flagged as being potentially fraudulent in the settlement request.

As mentioned above, the IPSP module 300 executes the fraud prevention sub-module 350 in step 306. An exemplary fraud prevention sub-module 350 according to various embodiments of the invention is shown in FIGS. 7A and 7B. As shown in FIG. 7A, the fraud prevention sub-module 350 performs various steps, referred to herein as "fraud filters", to detect potentially fraudulent transaction activity and may be configured to block or flag a transaction depending on the result of a particular fraud filter or a combination of results from a group of fraud filters. Steps 352-368 show several fraud filters that may be performed by the fraud prevention sub-module 350 according to various embodiments of the invention. FIG. 7B illustrates steps executed by the fraud prevention sub-module 350 to determine which fraud filters to apply to the transaction information, according to various embodiments of the invention.

For example, as shown in step 352 in FIG. 7A, the fraud prevention sub-module 350 may compare the payment card information with a list identifying stolen payment cards. In addition, as shown in step 354, the fraud prevention sub-module 350 may compare a location associated with a financial institution that issued the payment card with a location associated with the IP address associated with the customer's computing device. The IP address associated with the customer's computing device may be obtained by the merchant module 200 (e.g., by using IP address detection software integrated into the merchant module 200) when the transaction information is initially received by the merchant system 101, 102, 103. In addition, the fraud prevention sub-module 350 may be configured to compare the location associated with the IP address of the customer's computing device with the customer's billing address to ensure the location of the customer's computing device is within a particular radius of the billing address (e.g., 50 miles). Similarly, the fraud prevention sub-module 350 may compare the location associated with the financial institution that issued the payment card with a location associated with the email address provided by the customer, as shown in step 356, or compare the location of the IP address of the customer's computing device with the location associated with the email address provided by the customer, as shown as step 357. The locations compared above may include one or more of a country, a region, a state, a locality, a county, a city, or a postal district defined by one or more postal codes (e.g., zip codes).

In addition, as shown in step 358, the fraud prevention sub-module 350 may compare the banking identification number (BIN) of the payment card to a list of suspicious BINs, and in step 360, the fraud prevention sub-module 350 may identify and flag transactions initiated by customers having web mail email addresses (e.g., HOTMAIL or YAHOO email addresses). Furthermore, as shown in step 362, the fraud prevention sub-module 350 may compare the customer's information to a government-compiled list of persons that are prohibited from engaging in financial transactions with merchants within the government's jurisdiction. If the customer is identified on lists of persons, groups and entities subject to financial sanctions published by the jurisdiction, such as the "Specially Designated Nationals list" published by the U.S., the transaction may be denied. Similarly, as shown as step 368, the fraud prevention sub-module 350 may compare a country associated with the IP address of the customer's computing device with a list of countries that are prohibited from doing business with merchants in a particular jurisdiction, and if the country of the IP address is on the list, the transaction may be denied. In addition, as shown in step 367, the fraud prevention sub-module 350 may compare a customer's information with a list of officers, directors, or owners of the online merchant, and if the customer is on the list, the transaction may be flagged as being potentially fraudulent or denied.

According to various embodiments, the fraud prevention sub-module 350 may further be configured to monitor the frequency of transactions for each customer or each card for a particular time period (e.g., a month, a year), as shown in step 364. In addition, as shown in step 366, the fraud prevention sub-module 350 may be configured to monitor the type of transactions (e.g., gambling transactions, travel transactions, adult entertainment transactions) for each customer or card during a particular time period. By monitoring the frequency and type of transactions on a per card or per customer basis, the fraud prevention sub-module 350, according to various embodiments of the invention, can (1) identify potentially fraudulent use of a card if the pattern of its use changes dramatically and (2) identify potential addictions or abuses if the customer engages in a particular type of transaction more frequently or too frequently. The monitoring steps 364 and 366 may be accomplished, according to one embodiment, by establishing a range of frequency and/or types of transactions based on the customer's prior transactions and comparing future transactions to the established range. According to other embodiments, the ranges used by the fraud prevention sub-module 350 may be published by local governments or regulatory authorities, result from academic or institutional research or the like, or may be established by one or more of the participants.

FIG. 15 illustrates a process of monitoring compulsive spending behavior according to various embodiments of the invention. In particular, beginning at step 502, a new request for a financial transaction is received by the IPSP module 300. In response to receiving the new request, the IPSP module 300 retrieves a total amount of funds that have been stored in the memory 24 associated with previously requested financial transactions between the particular merchant 31, 32, 33 and customer, shown as step 504. In step 506, a sum of the total amount of funds retrieved and the amount of funds in the new request are compared with a pre-determined acceptable limit of funds to be spent with the merchant 31, 32, 33. If the sum exceeds the pre-determined acceptable limit, the IPSP module 300 notifies the appropriate party or parties (e.g., customer, the issuing bank, and/or the merchant) that the limit has been exceeded, shown as step 508. In an alternative embodiment of the invention, the IPSP module 300 may retrieve the amount of funds stored in the memory within a particular time period (e.g., 24 hours, 36 hours, week, month, quarter, year, etc.). In addition, in another alternative embodiment, the IPSP module 300 is configured for comparing the number of transactions conducted between the customer and the merchant during a particular time period, and if the number of transactions conducted exceeds a pre-determined acceptable limit, then the IPSP module 300 notifies the customer, issuing bank, and/or merchant that the limit has been exceeded.

Similarly, FIG. 16 illustrates a process of monitoring compulsive gambling behavior according to various embodiments of the invention. Beginning at step 602, a new request for a financial transaction is received by the IPSP module 300. The new request may include an amount of funds and a type of transaction (e.g., transferring funds to the merchant, placing a bet with the merchant, requesting a payout from the merchant). Next, in step 604, the IPSP module 300 retrieves a total amount of funds stored in the memory 24 for the type of financial transaction in the new request. Then, in step 606, a sum of the total amount of funds and the amount of funds in the new request are compared with a pre-determined acceptable limit associated with the type of financial transaction in the new request. If the sum exceeds the pre-determined acceptable limit, the IPSP module 300 notifies the appropriate party or parties (e.g., customer, the issuing bank, and/or the merchant) that the limit has been exceeded, which is shown as step 608. In one embodiment, if the sum exceeds the pre-determined acceptable limit, the new request is denied. Furthermore, the total amount of funds retrieved from the memory may be limited to those funds stored within a particular time period, and the pre-determined acceptable limit may be vary based on the time period being queried.

In addition to monitoring the types of transaction mentioned above, according to various embodiments of the invention, the fraud prevention sub-module 350 may be further configured to monitor payback request transactions and identify suspicious transactions. In response to identifying suspicious payback request transactions, such as by identifying transactions in which the payback request information does not align with information in the original transaction or by identifying a significant number of payback request transactions for a particular payment card during a particular time period (e.g., within a week, a month, or several months), the payment card number may be added to a list of prohibited payment cards, thus preventing future purchasing transactions with the payment card.

In addition to the above filters, according to various embodiments of the invention, the fraud prevention sub-module 350 may further be configured to (1) ensure that each customer only use one payment card and (2) limit payments for certain activities for each customer to a particular frequency during a particular time period (e.g., one payment per day or three payments per 36 hours). Furthermore, according to one embodiment, a ceiling may be set on the amount that can be spent per card or per customer on particular services (e.g., Internet gambling or adult entertainment) during a particular time period (e.g., per day, week, or month). In one embodiment, the ceiling may be set upon request by the customer. In another embodiment, the IPSP system 104 may introduce a default limit on the amount that can be spent on certain activities (e.g. 20% of the credit limit associated with the payment card), which could not be increased without the explicit request of the customer. According to one embodiment, the IPSP system 104 or the merchant system 101, 102, 103 may be configured to present materials to the customer regarding the risk of overspending in response to receiving a request to increase the spending limit, such as via a phone call from a specially trained employee or an email to the customer, and present materials or resources when potential abuse is detected (e.g., Gamblers Anonymous phone numbers, website address, or other materials).

According to various embodiments of the invention, the IPSP system 104 further includes a fraud and abuse database (not shown) that stores results from the fraud prevention module 350. In one embodiment, the IPSP module 300 accesses the database when processing transactions (step 302) or when executing the fraud prevention sub-module (step 306) to determine whether the transaction should be denied based on a prior fraud check for the particular payment card or customer.

As shown in FIG. 7B, the fraud prevention sub-module 350 may use one or more of the above described fraud filters to evaluate the transaction information received, according to one embodiment of the invention. Beginning at step 370, the fraud prevention sub-module 350 receives the transaction data from the IPSP module 300. Next, in step 372, the fraud prevention sub-module 350 determines the one or more fraud filters to use in evaluating the transaction data. For example, according to one embodiment, fraud prevention sub-module 350 uses the fraud filters that are previously selected by the merchant to be used. According to another embodiment, the type of fraud filters to be used depends on the type of transaction (e.g., an authorization request, a chargeback request, a settlement request, or a payment request) or whether the stage of the transaction (e.g., whether the transaction information has not yet been sent to the issuing bank or whether it has been authorized by the issuing bank already). In yet another embodiment, the type of fraud filters to be used depends on the country of the IP address associated with the customer. And, in another embodiment, the choice of which fraud filters should be applied is determined by the IPSP and/or the local regulatory authority. Finally, in step 374, the fraud prevention sub-module 350 executes the appropriate fraud filters to evaluate the transaction data.

In addition to executing the fraud prevention sub-module 350, the IPSP module 300 is further configured for identifying financial transactions that are illegal or subject to regulatory restrictions according to various embodiments of the invention. For example, FIG. 18 illustrates an exemplary process of identifying an illegal or regulated financial transaction. Beginning at step 802, the IPSP module 300 receives a request to transfer funds from a customer's payment card to the merchant 31, 32, 33. The request to transfer funds includes the customer's billing address and the location of the IP address associated with the computing device used by the customer to generate the request. Next, in step 804, the IPSP module 300 compares the customer's billing address, the location of the IP address, and the location of the merchant 31, 32, 33 with a list of locations that regulate the transfer of funds to the merchant 31, 32, 33. If any of these locations match a location on the list of locations, the IPSP module 300 determines whether one or more regulatory authorities regulate the transfer of funds in any of these locations, shown as step 806. If the IPSP module 300 determines that one or more regulatory authorities regulate the transfer of funds, the IPSP module 300 notifies the appropriate party or parties (e.g., customer, the merchant, and/or the issuing bank) of the one or more types of regulations to which the transfer of funds is subject, shown as step 808. The types of regulations to which a financial transaction may be subject includes a prohibition of the transfer (e.g., a gambling transaction in a state or region in which gambling is illegal) or a limitation on the transfer (e.g., a gambling transaction in a state or region that limits the amount of funds bet).

ASP Module

FIG. 8 illustrates a block diagram of an ASP module 400 according to various embodiments of the invention. Although the ASP module 400 may be configured to operate on an ASP system 105 according to one embodiment, it may also be configured to operate on the IPSP's system 104 if the IPSP does not contract with an ASP to provide accounting management services according to another embodiment.

Beginning in step 402, according to one embodiment, the ASP module 400 obtains transaction information from the IPSP system 104 and the acquiring bank system 106. The transaction information obtained from the IPSP system 104 may include the following data fields for each transaction: (1) a merchant identification ("MID") number, which is granted by the acquiring bank to identify the merchant or trading entity (e.g., specific website) of the merchant; (2) the date and time of the transaction; (3) the name of the customer; (4) the payment card number or a portion of the payment card number (e.g., the last four digits); (5) the cardholder's email address; (6) the currency of the transaction; (7) the type of payment card used (e.g., Visa, MasterCard, or American Express); (8) the payment amount; (9) an order reference number that the merchant allocated to the transaction; (10) an authorization code, which is a unique code generated by the issuing bank indicating whether the transaction was authorized; (11) the settled status of the transaction (e.g., "100" for completed transactions); (12) the "settled time," which is the time at which the IPSP sent the settlement request to the acquiring bank; (13) the cardholder's street and street number; (14) the cardholder's town; (15) the cardholder's country; (16) the cardholder's postal code; (17) a parent transaction reference, which, in the case of a refund request, is a reference to the original transaction that is being refunded; (18) order information, which merchants can use to include more information about the transaction in if they wish; (18) "site reference," which is the IPSP's reference to the merchant; (19) the type of transaction, which may include authorized transactions, refund transactions, and cancelled transactions (e.g., transactions that are cancelled or for which the amount has changed at the request of the merchant prior to the transfer of money by the issuing bank to the merchant and after a settlement request is transmitted from the IPSP to the acquiring bank); and (20) a unique reference number (URN) that uniquely identifies a transaction in the ASP system 105. According to one embodiment of the invention, this information may also be included in the settlement requests that are transmitted from the IPSP to the acquiring bank, which is discussed above in relation to step 310 in FIG. 6 and below in relation to steps 1102 and 1104 in FIG. 10A. The transaction information obtained from the acquiring bank system 106 may include the total amount of funds requested from the issuing banks, aggregated in one or more batches on a per merchant basis, for example.

According to various embodiments, to obtain the transaction information, the ASP module 400 may access secure web pages (e.g., maintained by each system 104, 106) on which the transaction information is posted and download the information to the ASP system 105, receive the transaction information through another type of electronic transmission (e.g, via email or fax), or a combination of both.

In various embodiments, the transaction information obtained in step 402 is stored on the ASP system 105, as shown in step 404 and the information obtained from the IPSP system 104 is compared to the information obtained from the acquiring bank system 106, as shown in step 406. In the embodiment shown in FIG. 8, step 406 is shown as occurring after step 404, but in other embodiments, the steps can occur simultaneously or in reverse order.

According to various embodiments of the invention, in the comparison step 406, the ASP module 400 identifies any transactions for which the transaction information provided by the IPSP system 104 does not match the transaction information provided by the acquiring bank system 106. In one embodiment, any non-matching transactions are flagged and reported to the merchant, the IPSP, and/or the acquiring bank in an exception report generated by the ASP module 400, which is discussed below in more detail in relation to step 410. In another embodiment in which the acquiring bank system 106 transfers the funds directly into accounts associated with each merchant and maintained by the IPSP 36 and/or the ASP 35, which is described below in relation to FIG. 14, the ASP module 400 is further configured to compare the transaction information provided by the IPSP system 104 and the acquiring bank system 106 with the amounts transferred into each merchant account.

After reconciling the transaction information provided by the IPSP system 104 and the acquiring bank 106, the ASP module 400 may then allocate payment amounts received during the settlement process to the various participants, which is shown as step 408 in FIG. 8. The payment amounts may include, for example, payment amounts to the merchants 31, 32, 33, commissions owed to the IPSP 34, the acquiring bank 36, and the ASP 35, and a percentage of funds to be deposited in a rolling reserve escrow account 41 for each merchant 31, 32, 33. For example, according to various embodiments, the various participants may require a certain percentage of funds received by the merchant 31, 32, 33 as payment for their services in the contracts 43, 45, 47, 49 with the merchant 31, 32, 33 and with each other. For example, the acquiring banks 36 may charge 3% of the funds received by the merchant 31, 32, 33 from the issuing banks 37, 38, 39, the card schemes may charge 1% of the funds transferred using their cards, the IPSP 34 may charge 5% for its payment related services, and the ASP 35 may charge the IPSP 34 3% of the money received by the IPSP 34 for its accounting management services. As another example, the ASP 35 may also calculate the provisional costs incurred by the IPSP 34 for various services, such as card verification, commission payments to the various participants, and any fees chargeable to the merchants 31, 32, 33 for chargebacks received.

In addition, according to various embodiments, the financial transaction system 100 may establish protocols that specify the percentage of funds that are to be used to fund the rolling reserve escrow account 41. For example, system protocol may require the ASP module 400 to allocate 7.5% of the funds to be received by each merchant 31, 32, 33 to the rolling reserve escrow account 41 for each merchant 31, 32, 33. In another example, according to one embodiment, the percentage specified for the rolling reserve account may be automatically increased or decreased depending on the number of payback requests received for the particular merchant 31, 32, 33. In addition, the ASP module 400, according to one embodiment, monitors and identifies funds that have remained in the account for the predetermined time period (e.g., six months, one year, or three years) and re-allocates those funds to the merchant 31, 32, 33 at the end of the time period. Furthermore, the escrow account 41 is shown in the embodiment in FIG. 1 as being part of the ASP system 35. However, in other embodiments, the escrow account 41 may reside or be maintained by a bank or other financial institution.

Next, in step 410, the ASP module 400, according to various embodiments, is configured to generate a reconciliation report, or an "advice note," for each merchant. In one embodiment, the advice note provides each merchant with a summary of the transactions processed for the merchant during a particular time period (e.g., a day or a week), the exception reports (if needed) created in the reconciliation step 406, a summary of payments allocated to each of the various participants in step 408, an summary of the activity in the escrow account during the particular time period, and the day on which the payments are to be transferred to the merchant 31, 32, 33. In another embodiment, the various portions of the advice note are included in separate reports (e.g., an exception report, a payment allocation report, and a transaction summary report). And, in yet another embodiment, the ASP module 400 is configured to generate one or more summary reports for the IPSP 34 and each merchant 31, 32, 33 according to the particular formats specified by each.

In the embodiment shown in FIG. 8, the ASP module 400 is further configured to (1) transmit the advice notes for each merchant 31, 32, 33 to the IPSP 34 for approval, which is shown as step 412, and (2) upon receiving approval for the advice note from the IPSP 34, which is shown as step 414, transmit the advice notes to the merchants 31, 32, 33, which is shown as step 416. In another embodiment in which the IPSP 34 does not contract with an ASP 35 to provide accounting management services (not shown), steps 412 and 414 may not be performed.

In addition, the ASP module 400 is configured to prepare and transmit payments to the various participants and to the escrow account as shown in step 418, according to various embodiments of the invention. Step 418 may include, for example, physically sending payment (e.g., checks or cash) to each of the participants, preparing the request for an electronic funds transfer (EFT) from an account associated with the ASP system 105 to the accounts associated with each of the various participants that are owed money, or a combination of both. Furthermore, although the payment step 418 is shown as occurring after step 416 in the embodiment shown in FIG. 8, the ASP module 400 according to other embodiments may be configured to perform the payment step 418 simultaneously with or prior to step 416.

In other embodiments of the invention, the ASP module 400 may be further configured to withhold local or regional taxes on relevant e-commerce transactions (e.g., Internet gambling transactions, or retail purchases) prior to transmitting payments to each merchant 31, 32, 33. For example, in one embodiment, the ASP module 400 may be configured to apply the applicable tax or licensing rate on the basis of the place of residence or the place of transaction of each customer and/or merchant and transfer the funds directly to the relevant tax or licensing authorities.

In particular, FIG. 17 illustrates an exemplary process of accounting for any taxes owed on a financial transaction. Beginning at step 702, the appropriate types of tax and corresponding taxation rates for each of one or more tax jurisdictions are stored in the memory 24. Next, at step 704, information associated with a financial transaction conducted between a customer and the merchant 31, 32, 33 is received. In response to receiving the information associated with the financial transaction, one or more relevant tax jurisdictions associated with the financial transaction are identified, shown as step 706. Next, in step 708, the memory is queried to determine the one or more types of tax associated with the identified tax jurisdictions. If one or more types of tax are associated with the identified tax jurisdictions, then the corresponding taxation rates for the types of tax are applied to the financial transaction to determine the tax owed on the transaction, which is shown as step 710. In addition, upon determining the tax owned on the transaction, the amount of tax owed is transferred to the relevant tax authorities, shown as step 712. In various embodiments, taxes may be levied depending on the location of the transaction originator (e.g., merchant), the customer, and/or the location of the computing device from which the customer placed the order.

In various embodiments, the amount of tax withheld and the amount paid to the tax authorities are stored in the system with the transaction information for a period of time, which, in some embodiments, allows for a full audit trail. For example, in one embodiment, the amount due is held in a designated bank account and is paid to the tax authorities periodically (e.g., monthly, weekly, daily, or in real time). In one embodiment, the amount due is paid the tax authorities via electronic funds transfer (EFT).

According to various embodiments, this tax accounting functionality lessens the burden on the merchants, customers, and tax authorities and provides a trustworthy accounting system for taxable transactions. In addition, in one embodiment, the ASP module 400 generates accounting reports for tax authorities that summarize the taxes due and/or taxes collected.

Furthermore, in various embodiments, transaction records may be audited electronically or manually through the ASP module 400. In particular, the unique reference number ("URN") associated with each transaction is tracked as the transaction is processed through the system. For example, in one embodiment, a plurality of transactions may be grouped into a batch file and sent to the acquiring bank for settlement. The ASP module 400 stores the URN associated with each transaction in the batch file along with information identifying the batch file such that each individual transaction is independently auditable.

C. Exemplary Processing Flows

Authorization Processing Flow

FIG. 9A illustrates the flow 1000 of processing an authorization request according to various embodiments of the invention. In one embodiment, the processing of the authorization request takes place online while the customer is waiting, and it typically takes about two to twenty seconds to process. If the authorization request is accepted by the issuing bank, the merchant accepts the customer's payment and the issuing bank blocks the amount requested against the credit limit or balance associated with the payment card.

According to various embodiments of the invention, the authorization request process 1000 begins at step 1002 by the merchant 31, 32, 33 receiving a request from a customer to transfer money from the customer's payment card to the merchant's account. The request may include, for example, the amount to be transferred and the customer's information and payment card information (assuming that the merchant does not have the customer's information and payment card information stored from a previous transaction). In one embodiment, the customer and payment card information may include the full name and address of the customer, the customer's email address, and the payment card number, expiration date, and any other identifying information associated with the payment card. In one embodiment, the request may be received by the merchant's system 101, 102, 103 and stored thereon.

Next, in step 1006, according to various embodiments of the invention, the merchant 31, 32, 33 verifies the format of the information received in the customer's request. In one embodiment, as discussed above in relation to the merchant module 200 shown in FIG. 5 and step 204, the merchant module 200 verifies whether the format of the payment card number is correct and whether all required fields have been completed.

After verifying the format of the information in step 1006, the merchant 31, 32, 33 transfers the transaction information to the IPSP 34 for further processing, which is shown as step 1010. The IPSP 34 receives and stores the transaction information on the IPSP system 104 and transfers to the acquiring bank 36 information needed by the acquiring bank 36 and the issuing banks 37, 38, 39 to process the authorization request, shown as step 1012. For example, the information may be transferred by the IPSP module 300 to the acquiring bank system 106 and may include the payment card number, the payment amount, and the billing address of the customer, according to various embodiments of the invention.

Next, in step 1014, the acquiring bank system 106 receives and stores the authorization request on the acquiring bank system 106. Then, in step 1016, the acquiring bank system 106 identifies the appropriate card issuer and issuing bank and routes the authorization request to the issuing bank via the appropriate card issuer network (e.g., the VISA, MasterCard, or American Express networks). Upon receiving the authorization request, the issuing bank system 107, 108, 109 verifies that the payment card is operational and valid, which is shown as step 1018, and that sufficient funds are available for the payment card, which is shown as step 1020. Upon approving the authorization request, the issuing bank system 107, 108, 109 sends an approval message to the acquiring bank system 106 through the card issuer network, shown as step 1022, and the acquiring bank system 106 receives the approval message and transmits the approval message to the IPSP system 104 in step 1024. Then, in step 1026, the IPSP system 104 receives and stores the approval message and transmits the approval message to the merchant system 101, 102, 103 that initiated the authorization request.

According to various embodiments, the elementary fraud check and identity/age verification steps (steps 204 and 206) discussed above in relation to FIG. 5 may be performed by the merchant module 200 simultaneously with, before, or after step 1010 of transferring the authorization request information from the merchant to the IPSP. In addition, according to various embodiments of the invention, the step of executing the fraud prevention sub-module 350, which is shown as step 306 in FIG. 6, may be performed by the IPSP module 300 simultaneously with, before, or after step 1012 of transferring the authorization request information from the IPSP to the acquiring bank.

In another embodiment of the invention, shown in FIG. 13, the customer's information is encrypted when sent to the merchant system 101a, 102a, 103a and through the network 115a to the IPSP system 104a (e.g., with 2048 bit variable encryption). In addition, the IPSP module 300a executes one or more of the fraud filters of the fraud prevention sub-module 350a and, if the fraud filters detect potentially suspicious activity, the IPSP module 300a sends the results of the fraud check to the merchant for approval prior to sending the authorization requests to the acquiring bank system 106a. After the merchant provides approval for the transaction, the IPSP module 300a transmits the authorization request to the acquiring bank, which then transmits the request to the issuing bank. After the acquiring bank receives the authorization message from the issuing bank, the acquiring bank stores the transaction information in a memory area of the acquiring bank system 106a (e.g., a database) and sends the authorization message to the IPSP system 104a. The IPSP module 300a forwards the authorization message to the merchant and may execute one or more fraud filters on the transaction information prior to generating a settlement request for the transaction.

Settlement Processing Flow

FIGS. 10A and 10B illustrate the exemplary flow 1100 of processing a settlement request according to various embodiments of the invention. A settlement request, according to various embodiments, is a request generated by the acquiring bank (or the IPSP on behalf of the acquiring bank) to transfer money from the issuing bank to the acquiring bank for payment to the merchant. According to various embodiments of the invention, the settlement request process 1100 begins at step 1102 with the IPSP system 104 generating a settlement request for each merchant 31, 32, 33 and transmitting the settlement requests in a batch file to the acquiring bank 36. In various embodiments, each settlement request contains the data for transactions that have been handled by the IPSP 34 during a particular time period (e.g., 24 hours, 48 hours, or week). The settlement requests may include authorized and unauthorized transactions or just authorized transactions, according to various embodiments of the invention. Next, according to various embodiments of the invention, in step 1104, the IPSP system 104 stores the settlement requests on the IPSP system 104. The settlement requests may be transferred to the ASP system 105 by downloading the settlement requests from a secure part of the IPSP system 104, or the IPSP 34 may send physical copies or electronic copies of the settlement requests to the ASP 35 (e.g., via email, facsimile, CD, DVD, or floppy disk). The contents of the settlement requests according to various embodiments of the invention are discussed above in relation to FIG. 8.

As shown in step 1106, the acquiring bank 36 receives the batch file and transmits the settlement requests to the appropriate issuing banks 37, 38, 39. In addition, the acquiring bank 36 generates and stores a payment report for the ASP 35 that summarizes the amount of funds (e.g., aggregate amount of funds) included in each settlement request for each issuing bank 37, 38, 39, which is shown as step 1108. One embodiment of the payment report generated by the acquiring bank 36 for the ASP 35 is discussed above in relation to FIG. 8.

Then, in step 1110, the issuing banks 37, 38, 39 transfer the requested funds to the acquiring bank 36. Next, in step 1112, the acquiring bank 36 transfers the funds received to the IPSP 34. Before the IPSP 34 (or the ASP 35) distributes the funds to the appropriate participants and the escrow account, the ASP system 105 obtains the settlement requests generated by the IPSP system 104 and the payment report generated by the acquiring bank 36 and reconciles the information obtained in step 1114. The results of the reconciliation performed in step 1114 may be summarized in a reconciliation report (or "advice note") by the ASP 35 according to various embodiments of the invention. Finally, in step 1116, the ASP 35 organizes the payments for each participant and the amount for transferring to the escrow account and transfers the payments to the participants and the escrow account.

According to one embodiment, the ASP module 400 is configured to perform steps 1114 and 1116, which is discussed above in relation to FIG. 8. For example, the ASP module 400 summarizes the results from reconciling the data provided by the IPSP and the acquiring bank in a reconciliation report that is sent to each merchant 31, 32, 33 periodically (e.g., daily or weekly). The reconciliation report summarizes the amounts that the merchant 31, 32, 33 can expect to receive in the merchant's bank account by a particular date. In addition, the reconciliation report includes the total amount that customers put in their respective merchant accounts and shows the following deductions and additions: (1) less commission and charges (covering payments to all participants in the payment chain); (2) less a "trust deduct" corresponding to a percentage of the total amount that is withheld for a certain time period (e.g., 6 months or a year) in the rolling reserve escrow account as security against chargebacks and refunds; (3) plus the "trust money" that was withheld during the certain time period and one day before the date of the advice note; (4) less any chargebacks communicated by the acquiring bank on the day of the advice note relating to previous transactions. Before transferring funds to the appropriate participants and the rolling reserve escrow account, the IPSP 34 reviews the reconciliation reports, including the dates on which payments are indicated to be paid. Upon receiving the approval of the IPSP 34 for the reconciliation reports, the ASP 35 transmits the reconciliation reports to the various merchants 31, 32, 33 and transfers the payments to the appropriate participants and the escrow account. In one embodiment, the transfer of funds may occur after the reconciliation reports are generated and approved. In another embodiment, the transfer of funds may occur prior to approval of the reconciliation reports.

According to the alternative embodiment shown in FIG. 14, the funds are directly deposited by the acquiring bank into an account for each corporate entity associated with each merchant (e.g., SG1, SG2, SG3, etc.). In addition, the ASP module 400a is further configured for reconciling the amounts received into each account with the settlement requests and the payment report obtained from the IPSP and the acquiring bank, respectively. In one embodiment, any amount not paid out of the account to the various participants or the escrow account is paid to the merchant.

Chargeback Processing Flow

Chargeback requests are requests initiated by an issuing bank on behalf of a customer to refund a particular charge to the customer's payment card account. For example, an issuing bank may initiate a chargeback request in response to a customer contesting a charge on the customer's payment card that the customer asserts was not authorized by the customer. FIG. 11 illustrates the exemplary flow 1200 of processing chargeback requests according to various embodiments of the invention.

Beginning at step 1202, the issuing bank 37, 38, 39 receives a request for a chargeback from a customer. Then, at step 1204, the issuing bank 37, 38, 39 transmits the chargeback request to the acquiring bank 36. The acquiring bank 36 receives the chargeback request and transmits it to the IPSP 34 in step 1206. Next, at step 1208, the IPSP 34 compares the chargeback request with the data from the original transaction. If the data in the chargeback request appears to match the data from the original transaction, the IPSP 34 transmits the request to the ASP 35 in step 1210. The comparison and transmittal steps 1208 and 1210 may be performed by the IPSP module 300 according to various embodiments of the invention as described above. Next, in step 1212, according to various embodiments of the invention, the ASP 35 forwards the chargeback amount from the merchant's escrow account to the acquiring bank 36, which then forwards the chargeback amount to the issuing bank 37, 38, 39 that initiated the chargeback request. In an alternative embodiment, the ASP 35 pays the chargeback amount to the issuing bank 37, 38, 39 by deducting it from the total amount that should be paid to the merchant 31, 32, 33 in the settlement request. Then, in step 1214, the ASP 35 stores the chargeback request. In various embodiments of the invention, the ASP module 400 is configured to perform steps 1212 and 1214.

If in step 1208 the chargeback request data does not match the data from the original transaction, the chargeback request may be flagged, according to various embodiments of the invention. In addition, if the number of flagged chargeback requests associated with a particular payment card exceed a certain number within a particular time period (e.g., two chargeback requests within a week or a month), the IPSP may include the particular payment card number on a list of payment cards that should not be accepted for payment by the merchant in the future (e.g., in the fraud and abuse database maintained by the IPSP 34).

In addition to the above, according to various embodiments, the ASP 35 reconciles chargeback requests processed by the acquiring bank 36 and the IPSP 34 during a particular time period (e.g., daily or weekly) with the transaction data from the original transactions. To reconcile the requests, the ASP 35 obtains a chargeback transaction report generated by the acquiring bank 36 and a chargeback transaction report generated by the IPSP 34 and compares the two reports with the data from the original transactions, shown as step 1216. In one embodiment, the comparison step 1216 is performed by linking the data in the chargeback reports with the data from the original transactions that has been stored in the memory of the ASP system 105. According to one embodiment, the chargeback data reports contain at least a portion of the following information: (1) reference to the original transaction that is being charged back; (2) the MID number; (3) the date that the chargeback request is made; (4) a description of the transaction as a "chargeback"; (5) the full card number; (6) the reference number granted by the acquiring bank; (7) a "reason code," which is a code number issued by the card issuer that indicates why the chargeback was initiated by the cardholder; (8) a description of why the chargeback was initiated; (9) type of currency for the chargeback amount; (10) chargeback amount; (11) the card number or portion thereof (e.g., first four digits of card number) provided by the acquiring bank; (12) the date that the original transaction was "posted" or authorized; (13) the date the original transaction took place; (14) the "type" of the original transaction; (15) the currency of the original transaction; (16) the amount of the original transaction; (17) the currency in which the transaction was settled; (18) the amount that was settled; (19) the original "default" currency provided by the acquiring bank; (20) the original "default currency" amount provided by the acquiring bank; (21) the "original slip," which is a reference to the "batch" of transactions that the transaction was part of when the acquiring bank released its data about the transactions of a particular day to the IPSP; (22) the "item slip" of the acquiring bank; (23) the authorization code of the original transaction; (24) the "batch number" of the acquiring bank; and (25) the "merchant DBA name," which is the name of the merchant as it appears on the customer's payment card statement. As described above in relation to FIG. 8, the ASP module 400 may be configured to perform this reconciliation step 1216 according to various embodiments of the invention.

According to various embodiments of the invention, the reports may be posted to the IPSP system 104 and the acquiring bank system 106 and downloaded by the ASP system 105, or the reports may be transmitted physically or electronically via email, facsimile, CD, DVD, or floppy disk, for example.

Payment Processing Flow

In some e-commerce sectors (e.g., gambling), money may need to be paid back to the customer. Paying the customer money may raise concerns about the risk of abuse for money laundering, especially with respect to Internet gambling. According to various embodiments of the invention, the system 100 addresses some of the risks associated with e-commerce transactions by exclusively making payments to the payment card account used by the customer to make the original payment to the merchant, creating a fully transparent "closed loop" between the customer and the merchant. Thus, according to one embodiment, funds originate from and flow back to the same account and all money flows are traceable, which makes e-commerce unattractive for money laundering schemes.

For example, FIG. 12 illustrates an exemplary flow 1300 of processing and transmitting payment to a customer when the customer submits a payment request. Beginning at step 1302, the merchant receives a request from the customer for payment and transmits the request to the IPSP. Next, in step 1304, the IPSP verifies that the customer is not included on a government or local authority sanction list (e.g., "Specially Designated Nationals list" published by the U.S.). In addition, according to one embodiment, the IPSP verifies that the nationality of the customer (e.g., based on the customer's billing address or the IP address of the customer's computing device) is not on a list of prohibited countries in which merchants may conduct business. According to various embodiments, if the customer (or customer's country) is on the list, the payment request cannot be processed by the system 100 and the request is denied. If the customer is not included on the sanction list(s) (or is not associated with a prohibited country), the IPSP 34 transmits the payment request to the merchant's bank, which is shown as step 1306. In response to receiving the request and verifying that the payment funds are in the merchant's account, the merchant bank transmits the funds to the IPSP 34, which is shown as step 1308. After the IPSP 34 has received the funds and stored a record of them in the IPSP system 104, the IPSP 34 transfers the funds to the acquiring bank 36 as shown in step 1310. Next, in step 1312, upon receiving the funds, the acquiring bank 36 transmits the funds to the issuing bank 37, 38, 39 that is associated with the customer's payment card that was used to make purchases (e.g., place bets) on the merchant's website. According to various embodiments, in step 1314, the issuing bank 37, 38, 39 may then credit the account associated with the payment card for the amount received from the merchant 31, 32, 33, or the issuing bank 37, 38, 39 may send a check to the customer that is listed as the card holder.

E-Wallet

In yet another embodiment of the invention (not shown), the financial transaction system 100 is configured to allow customers to purchase electronic tokens from the IPSP 34, which can then be used with participating merchants 31, 32, 33 for the agreed value, creating a prepaid "e-wallet" account. According to various embodiments, the features of the financial transaction system 100 are extendable to the e-wallet system. For example, instead of the merchant 31, 32, 33 receiving the request from the customer to transfer funds from the account associated with the customer's payment card to the merchant's account, the IPSP 34 receives the request to transfer funds from the customer's e-wallet account to the IPSP's account. According to one embodiment, the IPSP 34 executes the steps of the merchant module 200 and the IPSP module 300 to generate and process the authorization and settlement requests with the issuing bank. Upon settlement, the IPSP 34 credits an e-wallet account for the customer with an amount of electronic tokens representative of the amount of funds transferred. The customer can use the tokens with participating merchants 31, 32, 33 to make purchases. Periodically (e.g., daily or weekly), the IPSP 34 transfers funds to each merchant 31, 32, 33 that are representative of the amount of tokens spent at each merchant's website. In one embodiment, the ASP 35 manages the e-wallet accounts and allocates payments from the IPSP 34 to the participating merchants 31, 32, 33.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

The invention claimed is:

1. A tax accounting system for financial transactions conducted with online merchants, the system comprising:
a memory configured for storing one or more types of tax and corresponding taxation rates for each of one or more tax jurisdictions; and
a processor configured for:
receiving a settlement request, the settlement request comprising settlement information associated with a plurality of financial transactions conducted between an online merchant and one or more customers, the settlement request requesting transfer of funds from one or more accounts associated with the one or more customers for payment to the online merchant in regard to the plurality of financial transactions;
submitting the settlement request to an acquiring bank;
receiving a payment report from the acquiring bank, the payment report comprising payment information associated with a payment to be received for each of the plurality of financial transactions associated with the settlement request;
in response to receiving the payment report:
reconciling each of the plurality of financial transactions by comparing the settlement information for a particular financial transaction with the payment information for the particular financial transaction; and
identifying each of the plurality of financial transactions that reconcile; and
for each identified financial transaction that reconciles:
identifying one or more tax jurisdictions associated with the financial transaction based on the information associated with the financial transaction;
in response to identifying the one or more tax jurisdictions associated with the financial transaction, querying the memory to determine whether one or more types of tax are associated with the one or more tax jurisdictions;
in response to determining that one or more types of tax are associated with the one or more tax jurisdictions, applying the corresponding taxation rates for each of the one or more types of tax to the information associated with the financial transaction to determine an amount of tax owed; and
in response to determining the amount of tax owed:
obtaining the funds being transferred from the acquiring bank for payment to the online merchant for the financial transaction;
deducting the amount of tax owed from the funds;
transferring the amount of tax owed to one or more relevant tax authorities; and
transferring remaining funds comprising the funds less the amount of tax owed to the online merchant.

2. The tax accounting system of claim 1, wherein the processor is configured for sending a report to the merchant, the report comprising information for each financial transaction that does not reconcile.

3. The tax accounting system of claim 1 wherein the one or more tax jurisdictions are associated with one or more of a location of the online merchant, a location of the customer, or a location of a computing device used by the customer to conduct the financial transaction.

4. The tax accounting system of claim 1 wherein the processor is further configured for transferring the amount to the one or more relevant tax authorities via electronic funds transfer.

5. The tax accounting system of claim 1 wherein the processor is further configured for storing the amount of tax owed and the amount transferred to the one or more relevant tax authorities in the memory with the financial transaction information for a particular period of time.

6. The tax accounting system of claim 5 wherein the processor is further configured for generating an accounting report for each of the one or more relevant tax authorities, the accounting report comprising the amount of taxes owed to the relevant tax authority, the amount of tax transferred to the relevant tax authority, and at least a portion of the information associated with the financial transaction for which taxes were paid to the relevant tax authority.

7. A method for conducting financial transactions with online merchants, the method comprising the steps of:

receiving a settlement request, the settlement request comprising settlement information associated with a plurality of financial transactions conducted between an online merchant and one or more customers, the settlement request requesting transfer of funds from one or more accounts associated with the one or more customers for payment to the online merchant in regard to the plurality of financial transactions;

submitting the settlement request to an acquiring bank;

receiving a payment report from the acquiring bank, the payment report comprising payment information associated with a payment to be received for each of the plurality of financial transactions associated with the settlement request;

in response to receiving the payment report:

reconciling each of the plurality of financial transactions by at least one computer processor comparing the settlement information for a particular financial transaction with the payment information for the particular financial transaction; and identifying each of the plurality of financial transactions that reconcile; and for each identified financial transaction that reconciles:

identifying one or more tax jurisdictions associated with the financial transaction based on the information associated with the financial transaction;

in response to identifying the one or more tax jurisdictions associated with the financial transaction, querying memory to determine whether one or more types of tax are associated with the one or more tax jurisdictions;

in response to determining that one or more types of tax are associated with the one or more tax jurisdictions, applying the corresponding taxation rates for each of the one or more types of tax to the information associated with the financial transaction to determine an amount of tax owed; and in response to determining the amount of tax owed:

obtaining the funds being transferred from the acquiring bank for payment to the online merchant for the financial transaction;

deducting the amount of tax owed from the funds;

transferring the amount of tax owed to one or more relevant tax authorities; and transferring remaining funds comprising the funds less the amount of tax owed to the online merchant.

8. The method of claim 7 wherein the one or more tax jurisdictions are associated with one or more of a location of the online merchant, a location of the customer, or a location of a computing device used by the customer to conduct the financial transaction.

9. The method of claim 7 further comprising the step of transferring the amount to the one or more relevant tax authorities via electronic funds transfer.

10. The method of claim 7 further comprising the step of storing the amount of tax owed and the amount transferred to the one or more relevant tax authorities in the memory with the financial transaction information for a particular period of time.

11. The method of claim 10 further comprising the step of generating an accounting report for each of the one or more relevant tax authorities, the accounting report comprising the amount of taxes owed to the relevant tax authority, the amount of tax transferred to the relevant tax authority, and at least a portion of the information associated with the financial transaction for which taxes were paid to the relevant tax authority.

* * * * *